US011285378B1

(12) United States Patent
Mitreanu

(10) Patent No.: US 11,285,378 B1
(45) Date of Patent: Mar. 29, 2022

(54) BUSINESS SIMULATION BOARD GAME DEVICES AND METHODS

(71) Applicant: Cristian Mitreanu, San Francisco, CA (US)

(72) Inventor: Cristian Mitreanu, San Francisco, CA (US)

(*) Notice: Subject to any disclaimer, the term of this patent is extended or adjusted under 35 U.S.C. 154(b) by 193 days.

(21) Appl. No.: 15/712,749

(22) Filed: Sep. 22, 2017

(51) Int. Cl.
*A63F 3/00* (2006.01)
*A63F 13/335* (2014.01)

(52) U.S. Cl.
CPC ........ *A63F 3/00063* (2013.01); *A63F 13/335* (2014.09); *A63F 2003/00066* (2013.01)

(58) Field of Classification Search
CPC .................. A63F 3/0063; A63F 13/335; A63F 2003/00066; A63F 3/00063
USPC ............................................ 463/42; 273/236
See application file for complete search history.

(56) References Cited

U.S. PATENT DOCUMENTS

| | | | | |
|---|---|---|---|---|
| 2,026,082 A | * | 12/1935 | Darrow ............... | A63F 3/00072 273/256 |
| 4,648,601 A | * | 3/1987 | Carmichael ......... | A63F 3/00072 273/241 |
| 5,810,359 A | * | 9/1998 | Wilkins .............. | A63F 3/00072 273/256 |
| D759,763 S | | 6/2016 | Barrett | |
| 2008/0182669 A1 | * | 7/2008 | Amron ................... | A63F 13/00 463/44 |

OTHER PUBLICATIONS

Wikipedia, "Monopoly", retrieved from Internet URL<https://en.wikipedia.org/wiki/Monopoly_(game)>.*
"Careers (Board Game)", published to Internet on Wikipedia on Apr. 10, 2016 via waybackmachine.org, retrieved from Internet URL <http://web.archive.org/web/20160410075658/https://en.wikipedia.org/wiki/Careers_(board_game)>, p. 1-2. (Year: 2016).*

(Continued)

*Primary Examiner* — Jay Trent Liddle
*Assistant Examiner* — Ryan Hsu
(74) *Attorney, Agent, or Firm* — Law Office of Andrei D Popovici, PC

(57) ABSTRACT

A business-simulation board game kit and/or associated computer systems allow users to play a business-simulation board game simulating a business and/or economy comprising multiple business segments. A board game kit comprises multiple collections of playing pieces, a game board, game currency pieces, and game-specific dice. Each player's collection of playing pieces comprises playing pieces representing business segments. Each playing piece represents one business segment, and a business segment is represented by multiple playing pieces. The game board defines a grid of game board areas arranged along one axis by business complexity and along another axis by value. Players place, move and remove playing pieces to/from the board during expansion, restructuring, and conclusion game phases. An alignment of a player's playing pieces along the board yields a game currency bonus for the player. Industry- and/or scenario-specific transparent scenario layers may be added to the board.

10 Claims, 16 Drawing Sheets

(56) References Cited

OTHER PUBLICATIONS

Mitreanu, Cristian, "Changing Business . . . with a Casual Video Game", Linkedin presentation posted on https://www.linkedin.com/pulse/20141031062302-73688810-changing-the-way-we-learn-business-with-a-casual-video-game?published=t, Oct. 31, 2014.

Mitreanu, Cristian, "Changing the Way We Learn Business", slides presented at the 2012 Game Design Conference, San Francisco, CA, Sep. 17, 2012.

Mitreanu, Cristian, "Ofmos—Playing the Prototype Start to Finish in 3.5 minutes," screen shots from video posted on https://vimeo.com/25595797, Jun. 25, 2011.

Mitreanu, Cristian, "Spointra and the Secret of Business Success (The Aged Edition)", San Francisco, CA, 2013, the year of the publication is sufficiently earlier than the effective U.S. filing date and any foreign priority date so that the particular month of publication is not in issue.

Kinni, Theodore, "The Thought Leader Interview: Rita Gunther McGrath," strategy + business, Issue 74, New York, NY, Spring 2014, the year of the publication is sufficiently earlier than the effective U.S. filing date and any foreign priority date so that the particular month of publication is not in issue.

Reeves et al., "Die Another Day: What Leaders Can Do About the Shrinking Life Expectancy of Corporations", The Boston Consulting Group, Boston, MA, Dec. 2015.

Lisa, Kristen, "MBA Student Creates Video Game to Teach Business Fundamentals", downloaded from https://illinois.edu/blog/view/768/52757, May 11, 2011.

* cited by examiner

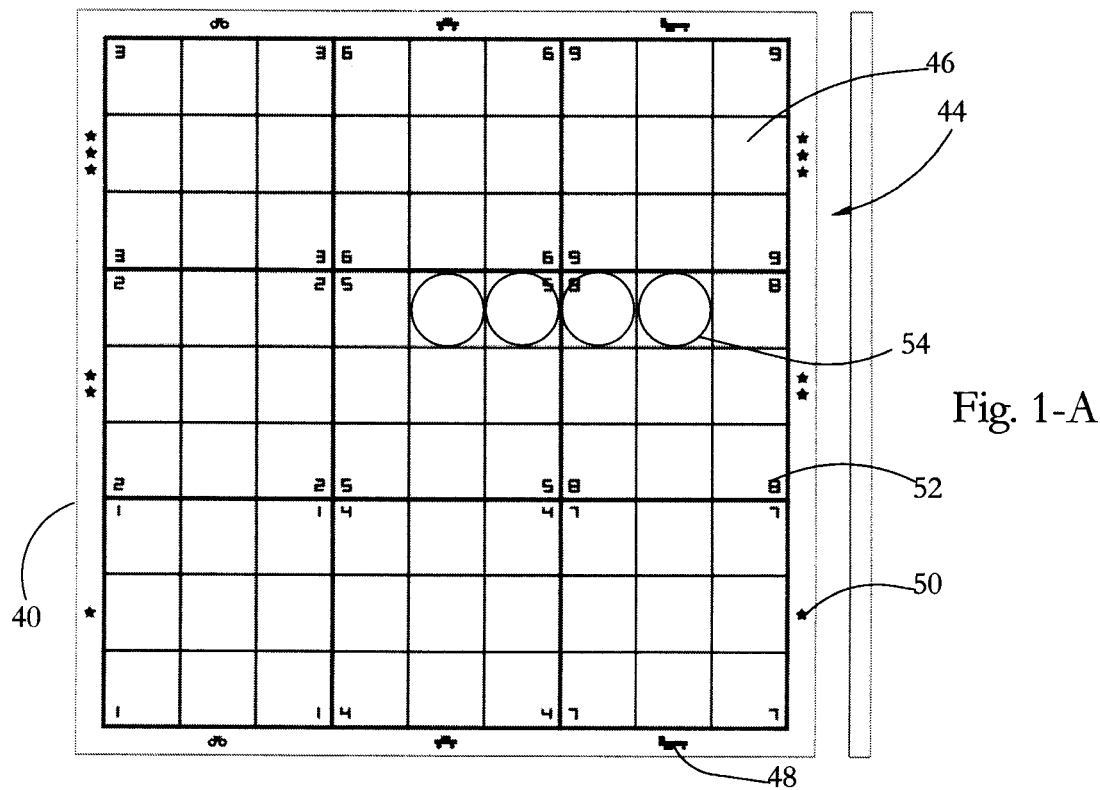
Fig. 1-A
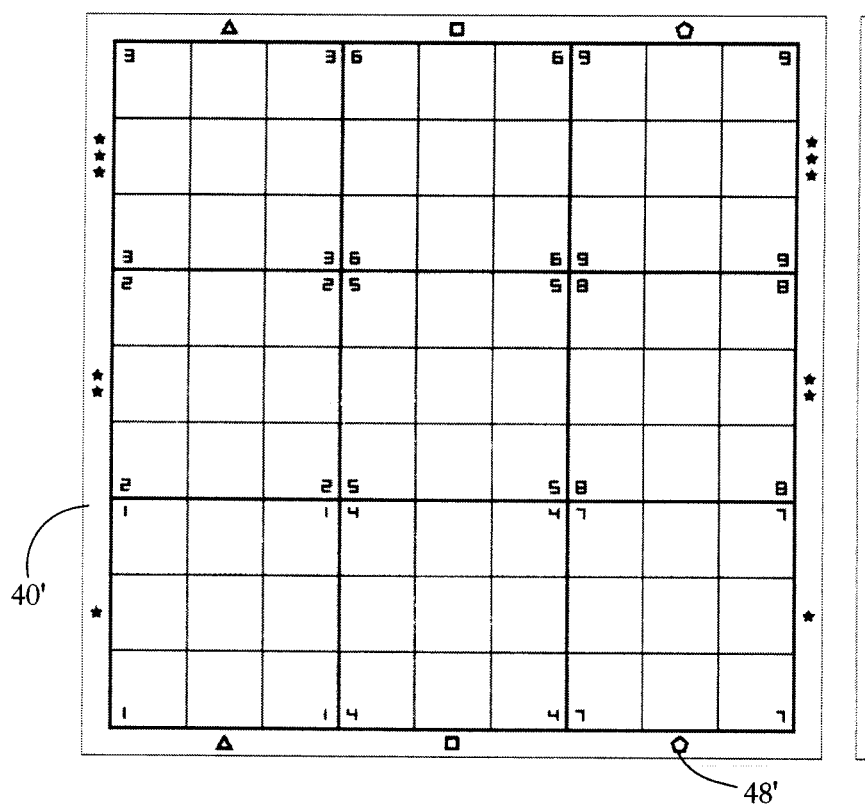
Fig. 1-B

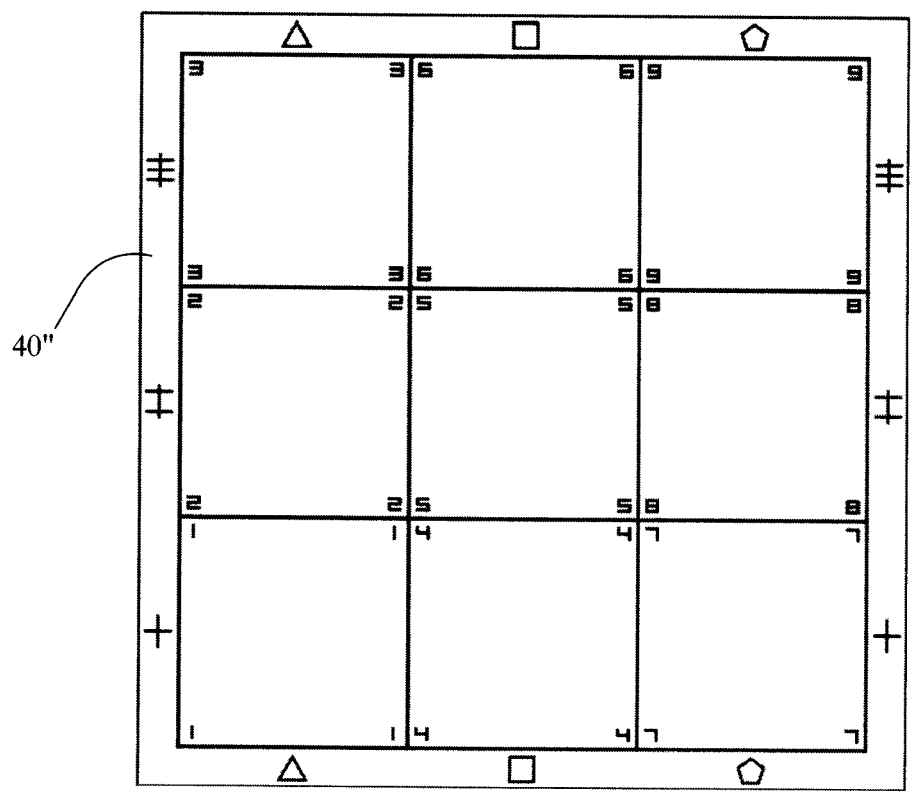
Fig. 1-C
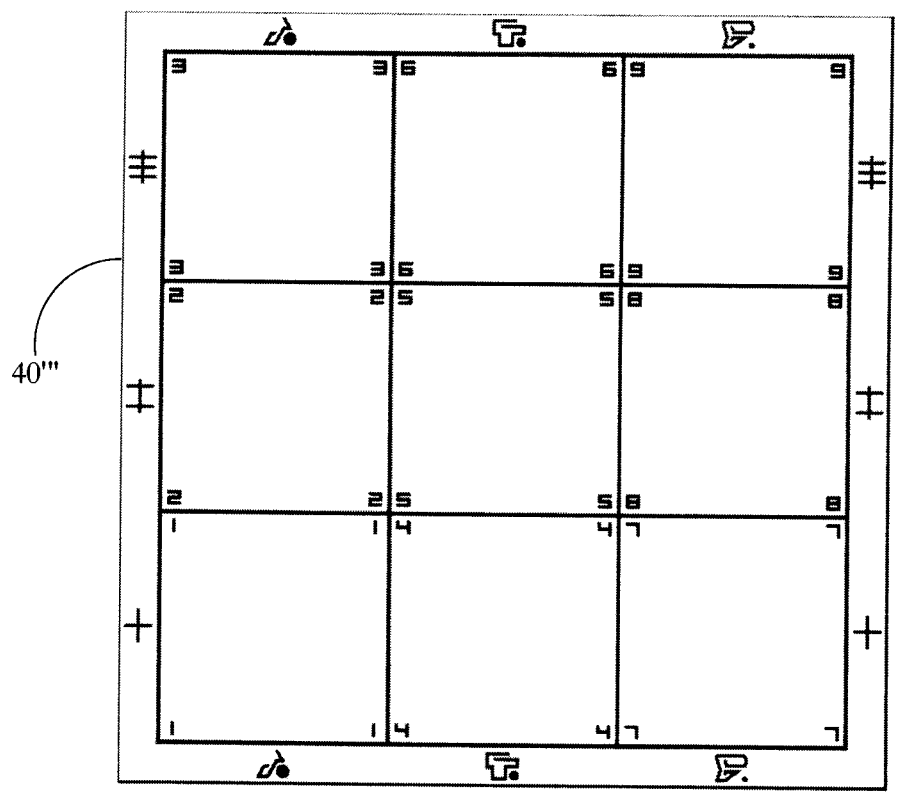
Fig. 1-D

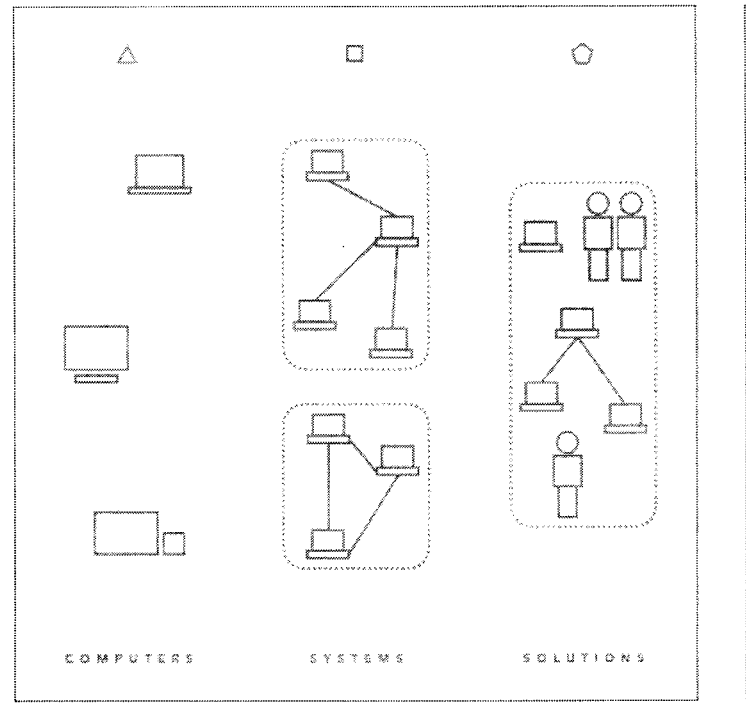
Fig. 2-A
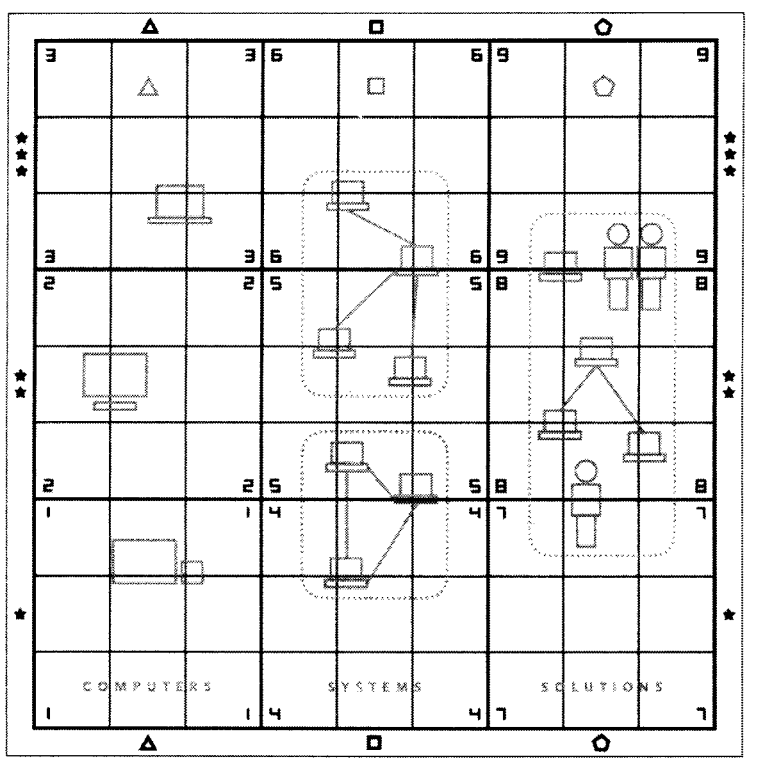
Fig. 2-B

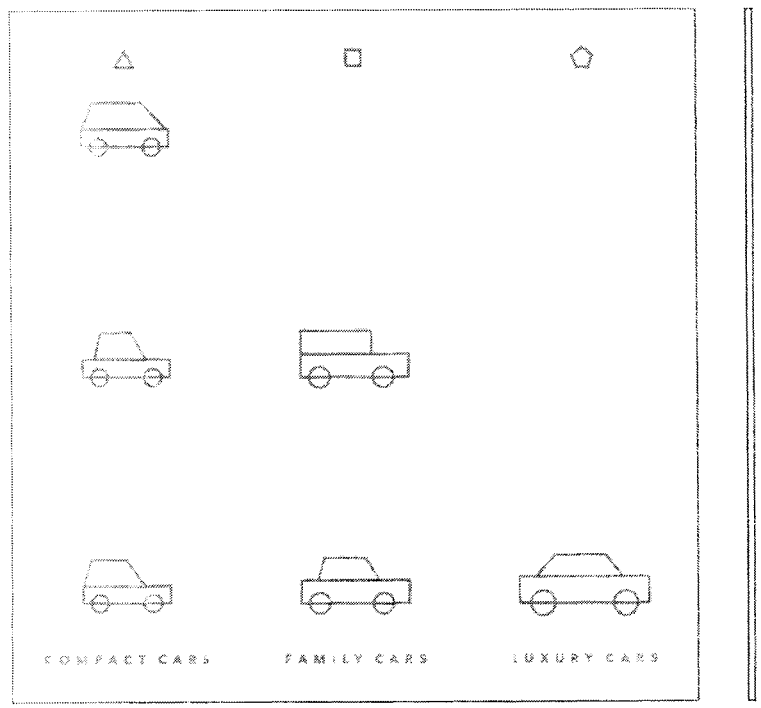
Fig. 2-C
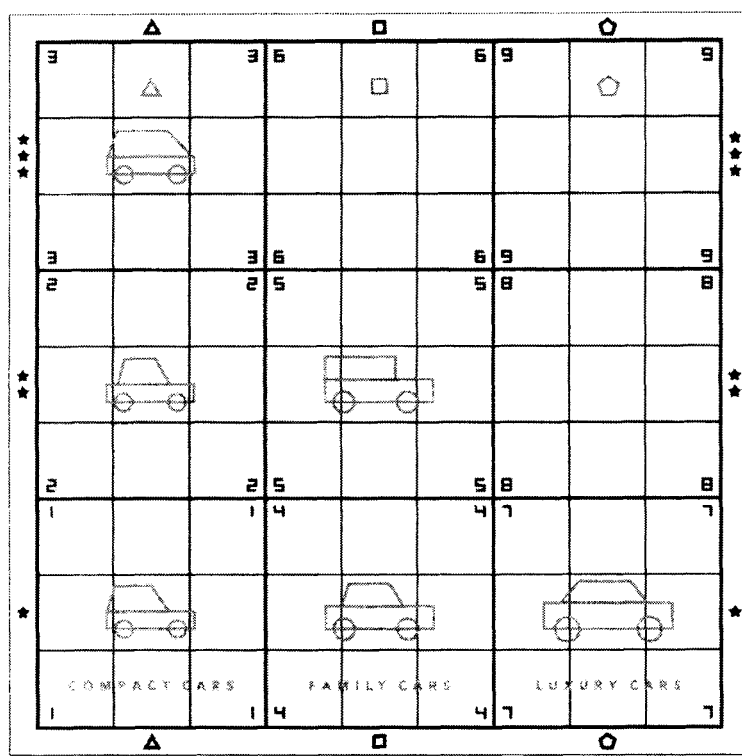
Fig. 2-D

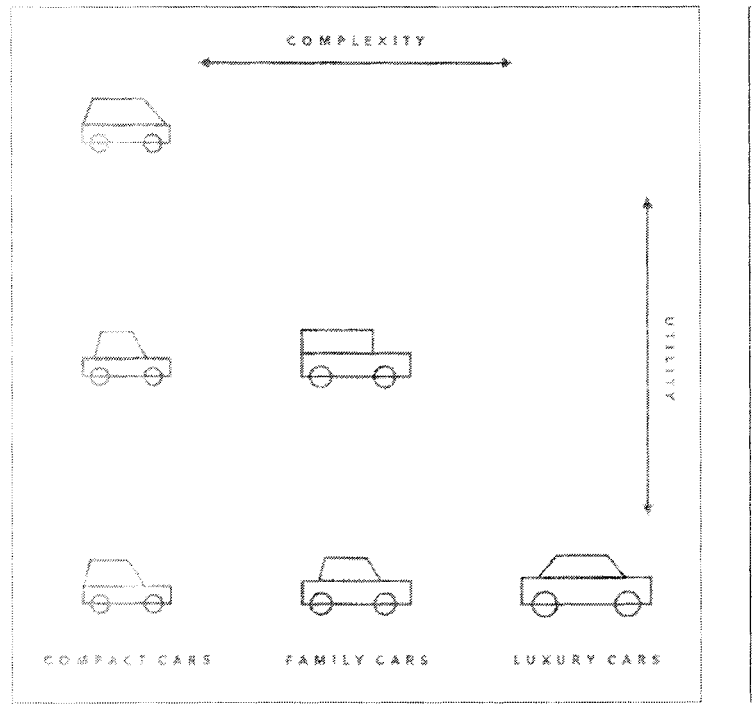
Fig. 2-E
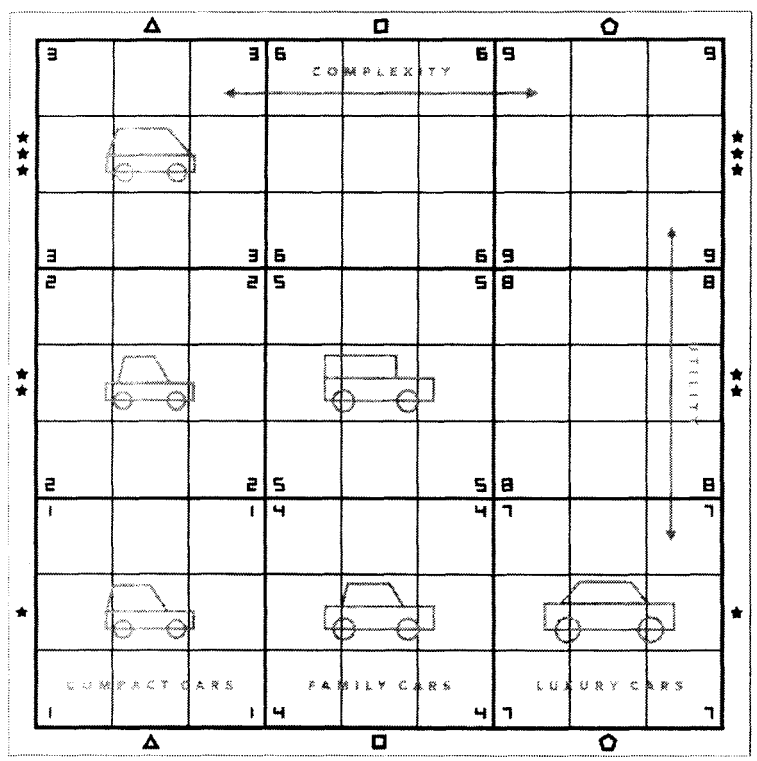
Fig. 2-F

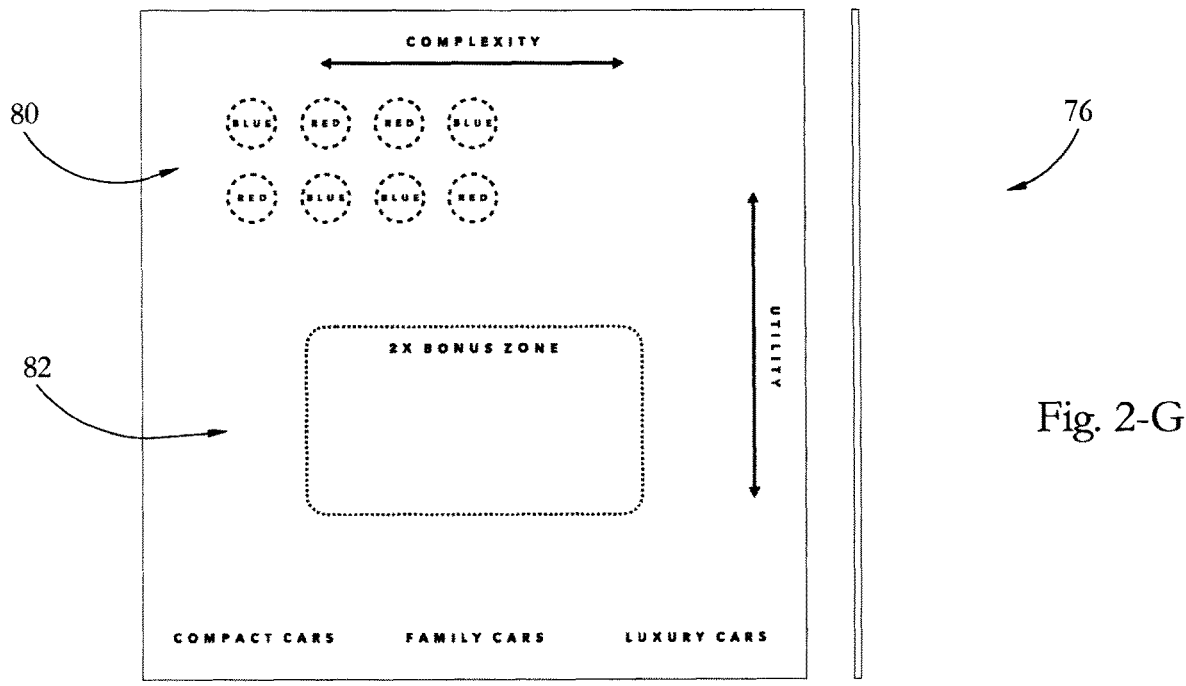
Fig. 2-G
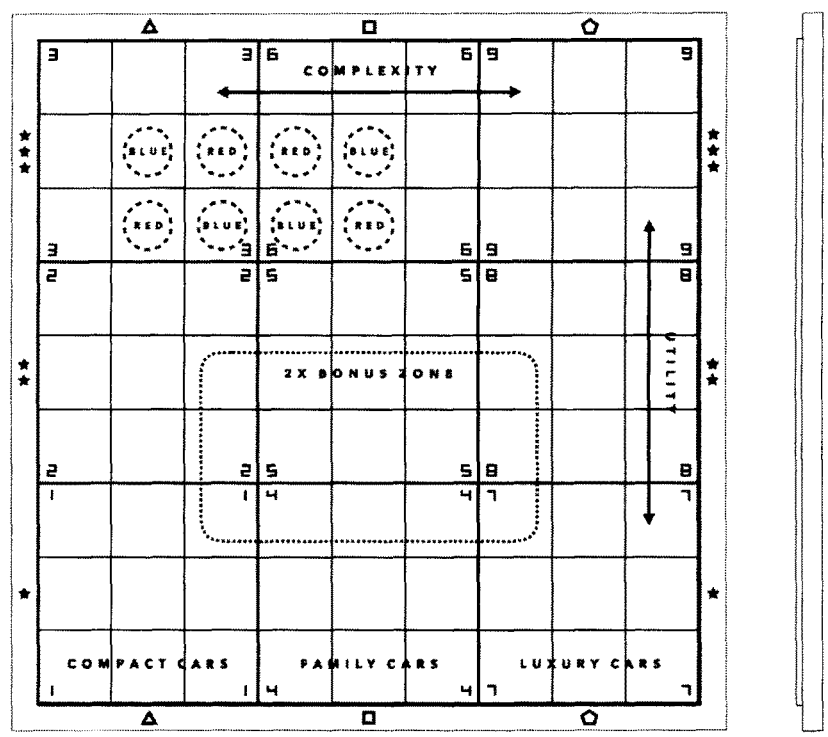
Fig. 2-H

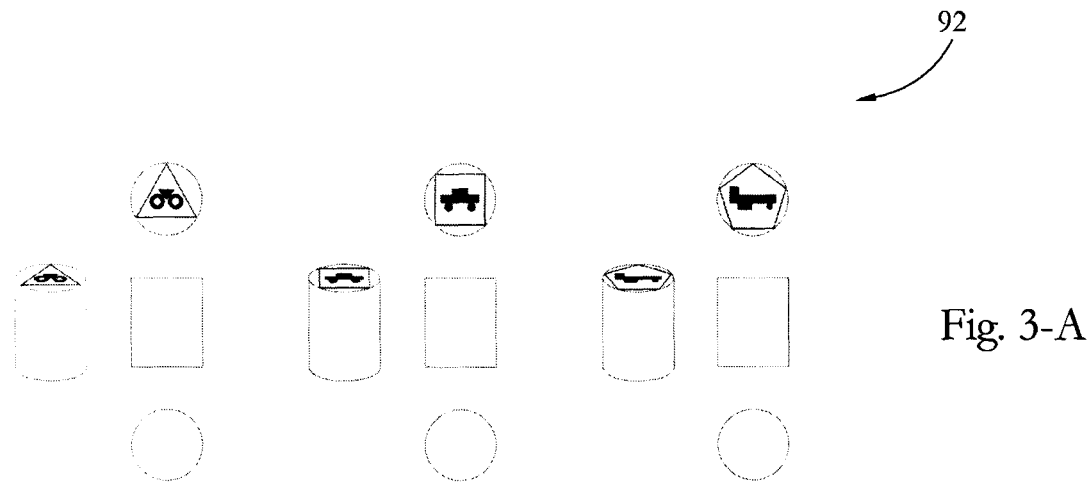
Fig. 3-A
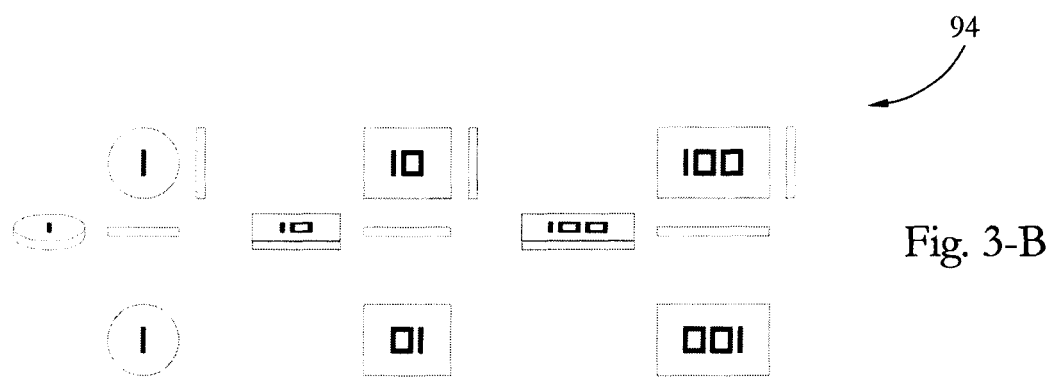
Fig. 3-B
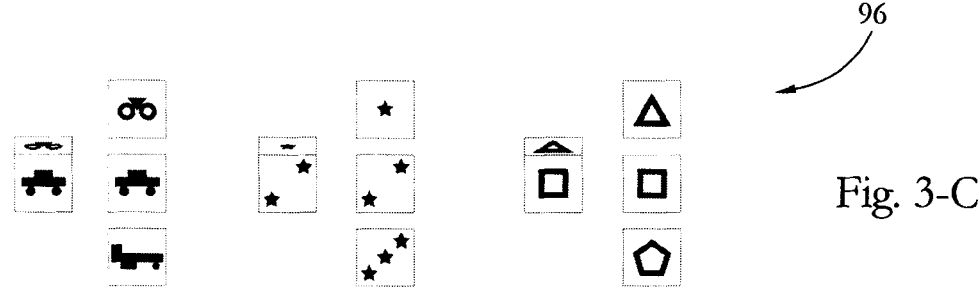
Fig. 3-C

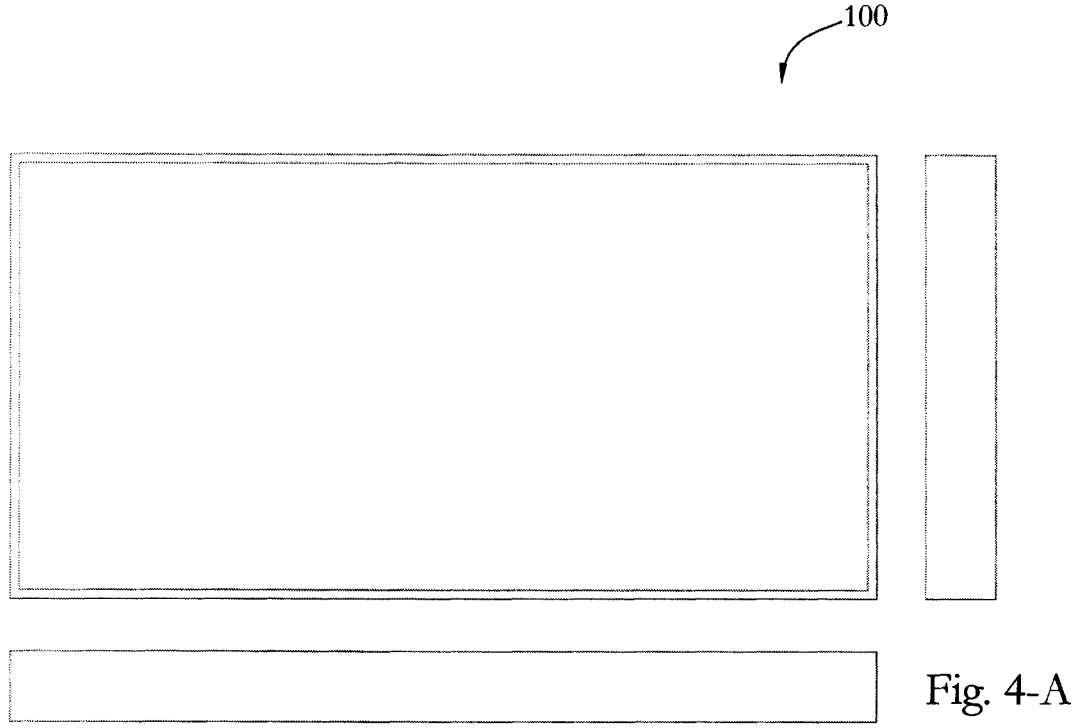
Fig. 4-A
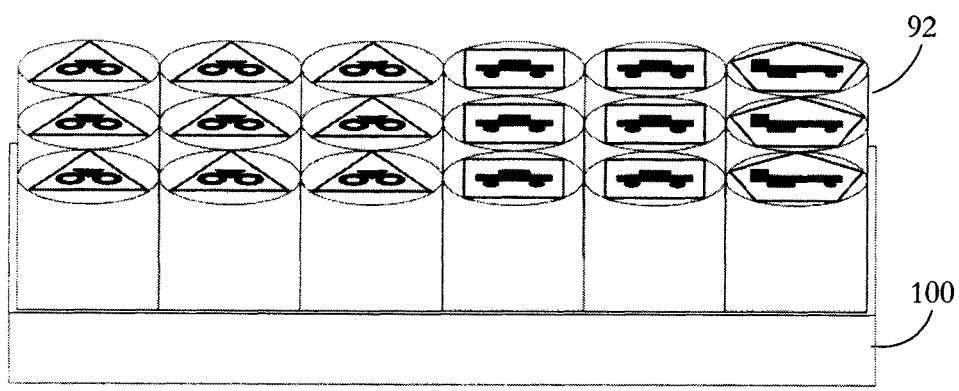
Fig. 4-B

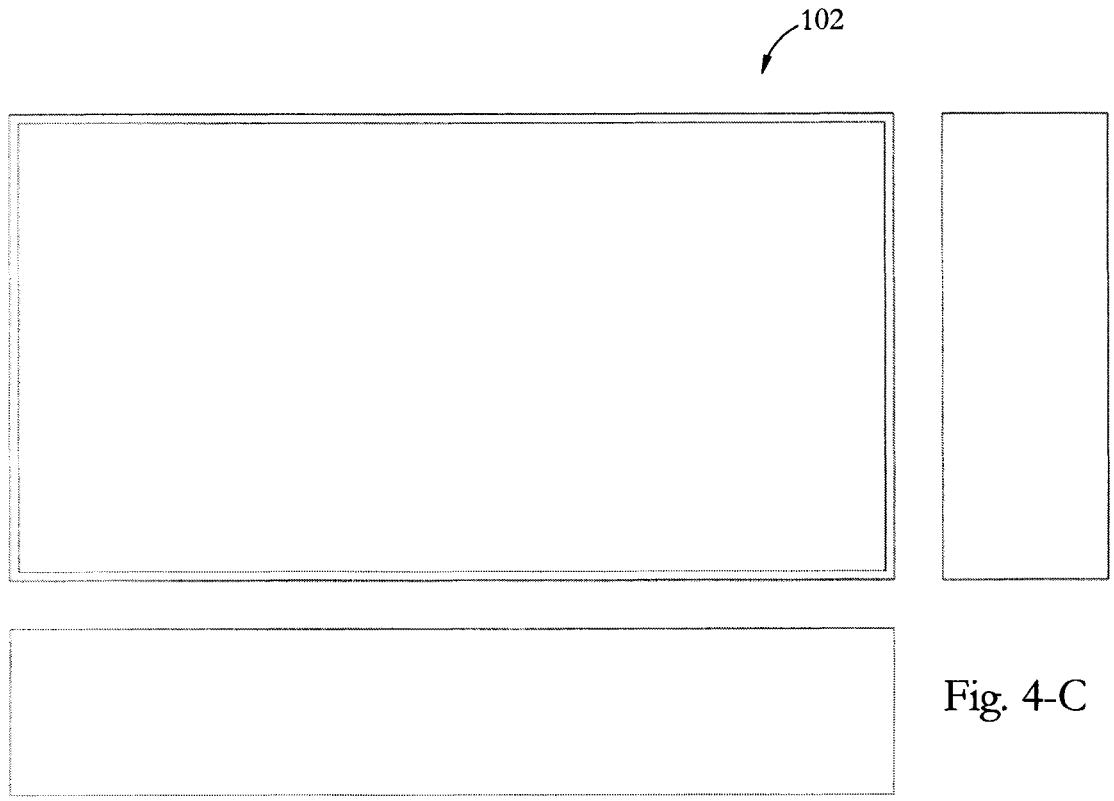
Fig. 4-C
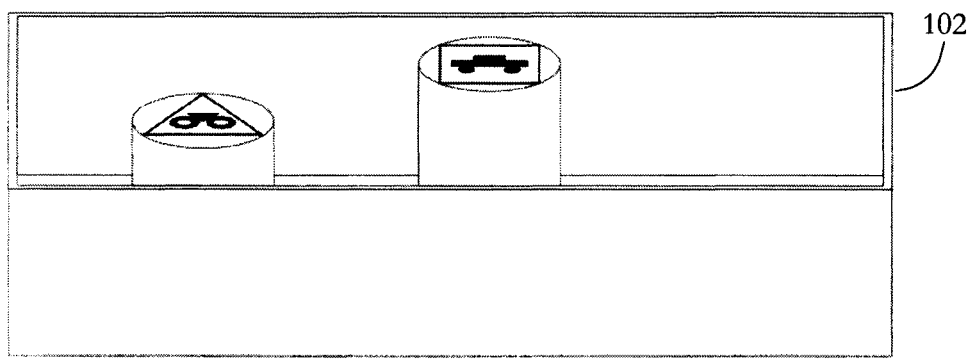
Fig. 4-D

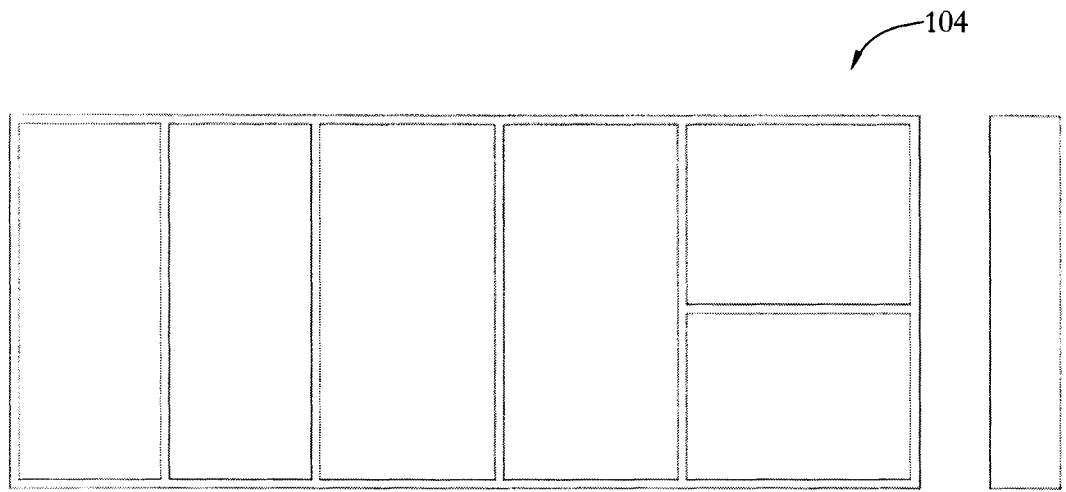
Fig. 5-A
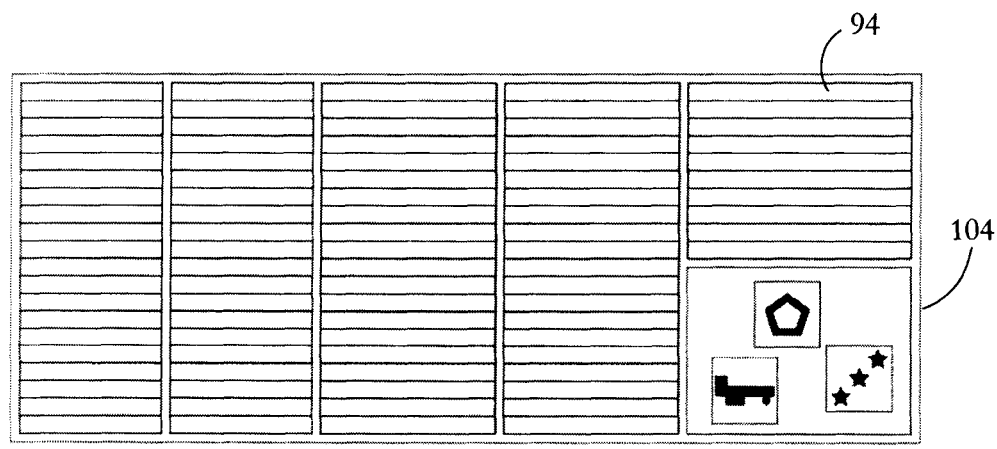
Fig. 5-B

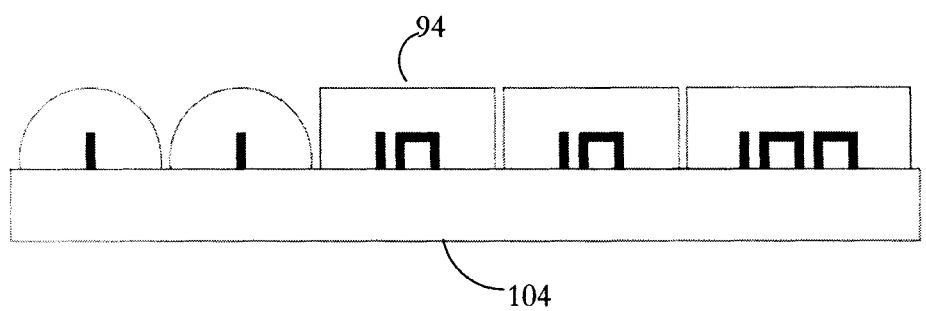
Fig. 5-C
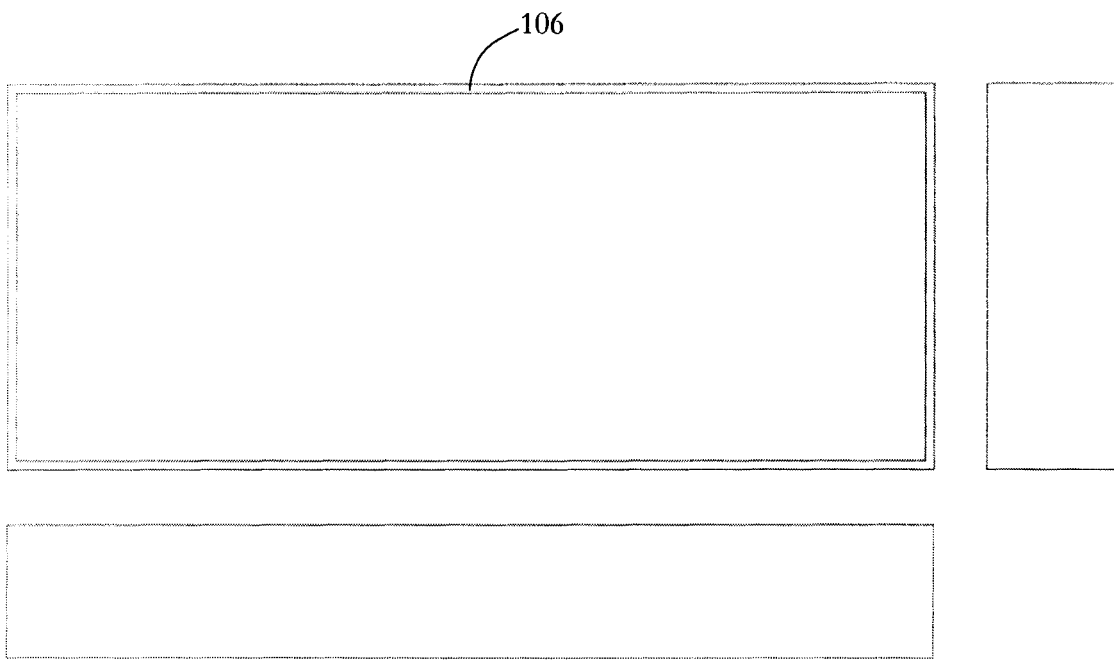
Fig. 5-D

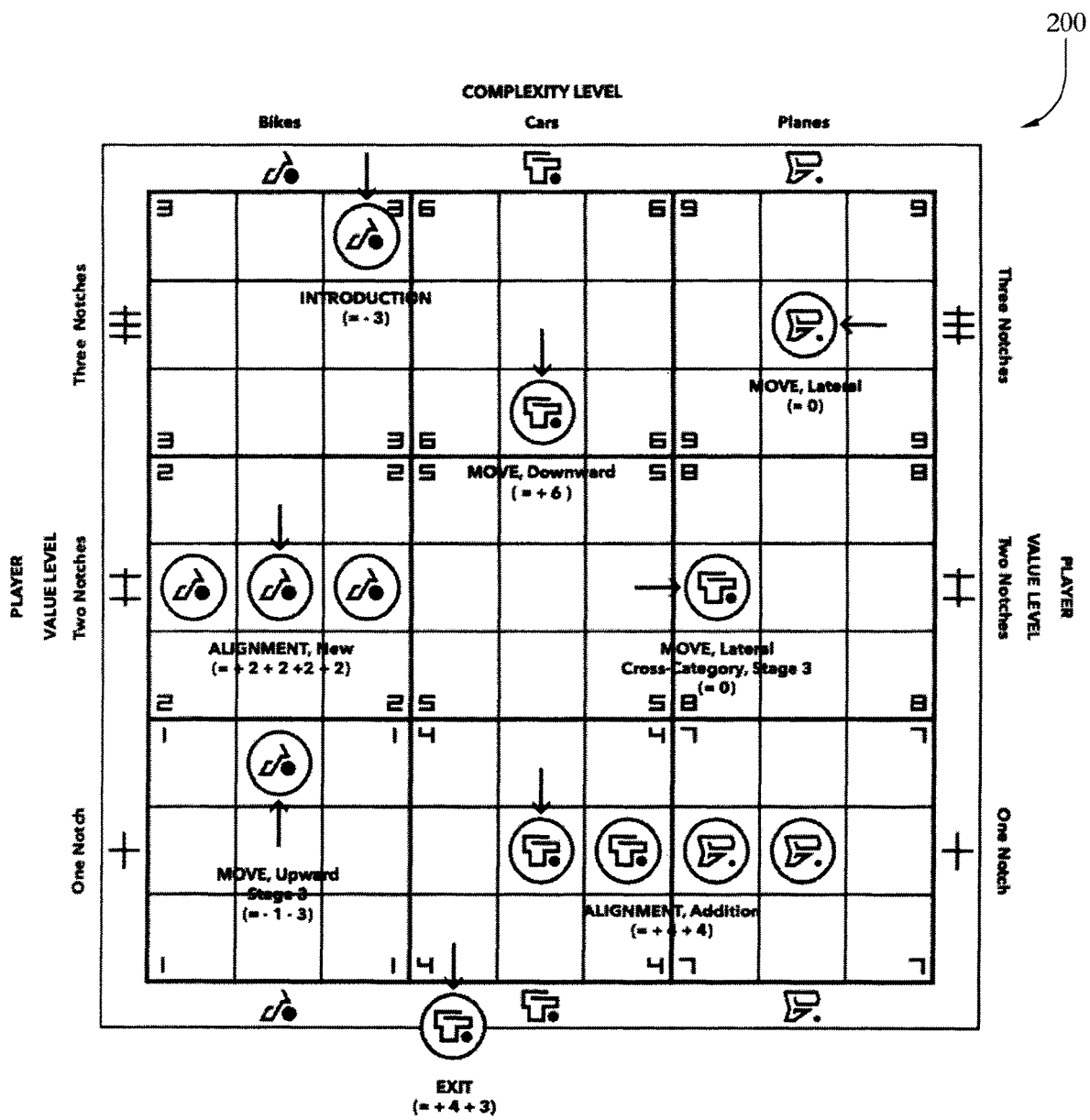
Fig. 6-A

| CASH FLOW | (+) INCOMING CASH | (−) OUTGOING CASH |
|---|---|---|
| Strategically use the four types of actions (introduction, move, exit, no-action) and the alignments of ofmos to achieve your goal. And since cash is the only form of money, and borrowing is not allowed, keep your cash flow positive. | MOVE, Downward ... $ of originating position of moved ofmos<br><br>ALIGNMENT, New ... $ of move or introduction of ofmos + sum of $ of each final position of all ofmos in alignment<br><br>ALIGNMENT, Addition ... $ of move or introduction of ofmos + sum of $ of each final position of all new ofmos added to alignment<br><br>EXIT ... $ of originating position of moved ofmos + $3 bonus | INTRODUCTION ... $ of landing position of introduced ofmos<br><br>MOVE, Lateral ... 0<br><br>MOVE, Upward (stage 3 only) ... $ of originating position of moved ofmos + $3 fee<br><br>NO-ACTION, Intentional ... $9 fee<br><br>NO-ACTION, Unintentional ... $ of area indicated by dice (for stage 1), and smallest $ of the three areas indicated by die (for stage 2) |

Fig. 6-B

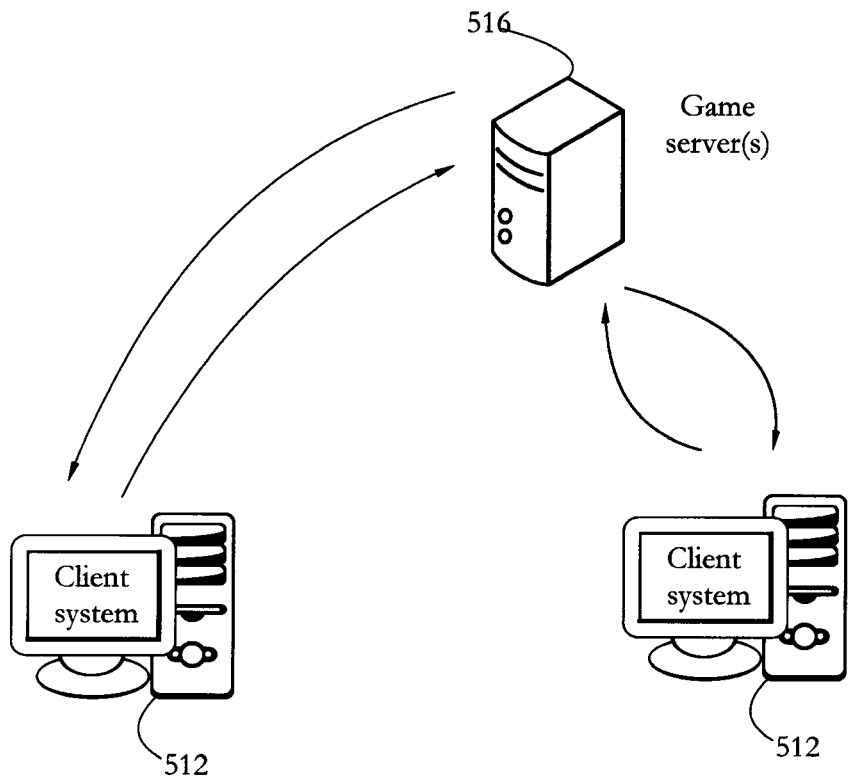
Fig. 7-A
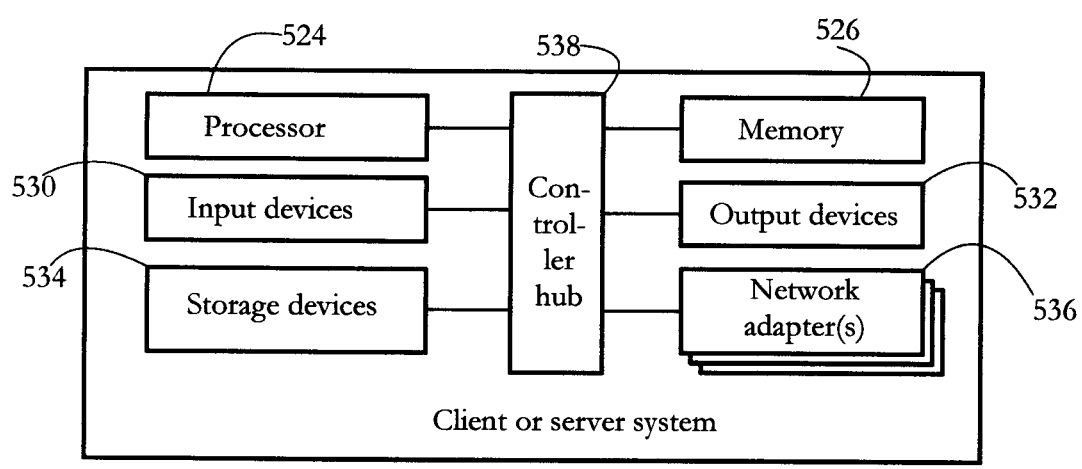
Fig. 7-B

BUSINESS SIMULATION BOARD GAME DEVICES AND METHODS

BACKGROUND

The invention relates to a board game for a multi-player game simulating a business and/or economy, and in particular to board game kits (sets) and corresponding electronic board game systems for playing such board games.

SUMMARY

According to one aspect, a business-simulation board game kit for a multi-player game simulating a business and/or economy comprises: a plurality of collections of playing pieces, and a game board. Each collection of playing pieces is assigned to a corresponding player of a plurality of players. Each collection of playing pieces comprises a plurality of playing pieces representing a business or economy comprising a plurality of business segments. Each playing piece represents one business segment selected from the plurality of business segments. A given business segment is represented by multiple playing pieces. The game board has a playing surface defining a plurality of game board areas arranged along one axis by business complexity and along another axis by value. Each game board area corresponds to one business complexity and one value. The game board areas are configured to hold playing pieces placed on the board or moved along the board by players. The game board areas are configured to allow an alignment of a player's playing pieces, the alignment yielding a game currency bonus for the player.

According to another aspect, a method of playing a multi-player business-simulation board game simulating a business and/or economy comprises: placing playing pieces on a game board of the business-simulation board game; moving playing pieces along the game board; and providing a game currency bonus to a player in response to an alignment of a player's playing pieces along the game board. The playing pieces belong to a plurality of collections of playing pieces, each collection of playing pieces assigned to a corresponding player of a plurality of players, each collection of playing pieces comprising a plurality of playing pieces representing a plurality of business segments. Each playing piece represents one business segment selected from the plurality of business segments, wherein a given business segment is represented by multiple playing pieces. The game board has a playing surface defining a plurality of game board areas arranged along one axis by business complexity and along another axis by value, each game board area corresponding to one business complexity and one value, wherein the game board areas are configured to hold playing pieces placed on the board by players.

According to another aspect, a non-transitory computer-readable medium stores instructions which, when executed by at least one hardware processor, cause the at least one hardware processor to: generate a display of a game board for a multi-player business-simulation board game simulating a business and/or economy; in response to user input received from a plurality of game players playing the board game against each other, generate displays reflecting the placement and movement of playing pieces on the game board by the players; and provide a game currency bonus to a player in response to the player's generating an alignment of playing pieces on the game board. The game board has a playing surface defining a plurality of game board areas arranged along one axis by business complexity and along another axis by value, each game board area corresponding to one business complexity and one value. Each player is assigned a collection of playing pieces. Each collection of playing pieces comprises a plurality of playing pieces representing a plurality of business segments. Each playing piece represents one business segment selected from the plurality of business segments, and a given business segment is represented by multiple playing pieces.

BRIEF DESCRIPTION OF THE DRAWINGS

The foregoing aspects and advantages of the present invention will become better understood upon reading the following detailed description and upon reference to the drawings where:

FIGS. 1-A-D show exemplary boards for a business simulation board game according to some embodiments of the present invention.

FIG. 2-A shows an exemplary transparent scenario layer configured to be used with a board for a business simulation board game according to some embodiments of the present invention.

FIG. 2-B shows the scenario layer of FIG. 2-A overlaid on the board of FIG. 1-B, according to some embodiments of the present invention.

FIG. 2-C shows another exemplary transparent scenario layer configured to be used with a board for a business simulation board game according to some embodiments of the present invention.

FIG. 2-D shows the scenario layer of FIG. 2-C overlaid on the board of FIG. 1-B, according to some embodiments of the present invention.

FIG. 2-E shows another exemplary transparent scenario layer configured to be used with a board for a business simulation board game according to some embodiments of the present invention.

FIG. 2-F shows the scenario layer of FIG. 2-E overlaid on the board of FIG. 1-B, according to some embodiments of the present invention.

FIG. 2-G shows another exemplary transparent scenario layer configured to be used with a board for a business simulation board game according to some embodiments of the present invention.

FIG. 2-H shows the scenario layer of FIG. 2-G overlaid on the board of FIG. 1-B, according to some embodiments of the present invention.

FIGS. 3-A-B-C show exemplary playing pieces, game currency pieces, and dice, respectively, according to some embodiments of the present invention.

FIGS. 4-A-B illustrate an exemplary bottom tray of a playing piece case according to some embodiments of the present invention.

FIGS. 4-C-D illustrate an exemplary cover for a playing piece case according to some embodiments of the present invention.

FIGS. 5-A-C illustrate an exemplary bottom tray of a game currency case according to some embodiments of the present invention.

FIG. 5-D illustrates an exemplary cover for a game currency case according to some embodiments of the present invention.\

FIGS. 6-A-B show exemplary images forming part of an instruction set used to inform players of available game moves and associated game currency costs/revenue, according to some embodiments of the present invention.

FIG. 7-A illustrates an exemplary system configuration suited for a network implementation of a business simulation game according to some embodiments of the present invention.

FIG. 7-B illustrates an exemplary hardware configuration of a computer system according to some embodiments of the present invention.

DETAILED DESCRIPTION

Figure 8:
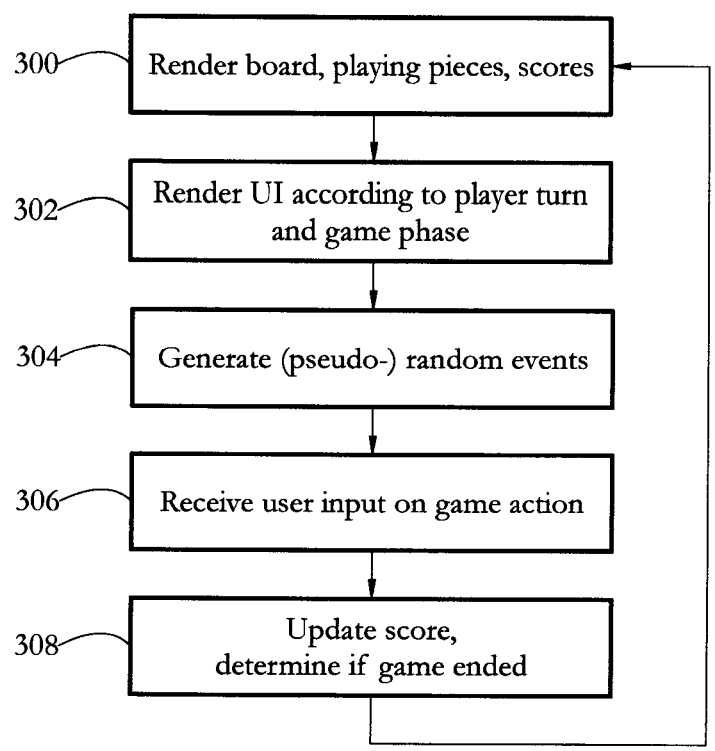
FIG. 8 shows an exemplary sequence of steps performed to implement a business simulation game on a computer system according to some embodiments of the present invention.

Systems and methods described herein may include or employ mechanical board game kits (sets) including playing board(s), playing pieces, game currency pieces, and/or special-purpose dice, as well as computer systems including one or more interconnected devices including one or more processors and associated memory. Such computer systems may execute software implementing methods described herein. In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. The term "server" encompasses a physical machine, as well as a collection of interconnected physical machines that may be identified by one or more domain or subdomain names. A computer program is a sequence of processor instructions carrying out a task. Computer programs described in some embodiments of the present invention may be stand-alone software entities or sub-entities (e.g., subroutines, libraries) of other computer programs. Computer readable media encompass storage media such as magnetic, optic, and semiconductor media (e.g. hard drives, optical disks, flash memory, DRAM), as well as communications links such as conductive cables and fiber optic links. According to some embodiments, the present invention provides, inter alia, computer systems programmed to perform the methods described herein, as well as computer-readable media encoding instructions to perform the methods described herein. It will be clear to one skilled in the art that the embodiments described herein may be altered in many ways without departing from the scope of the invention.

FIG. 1-A shows top and side views of an exemplary game board 40 for a business simulation board game according to some embodiments of the present invention. Game board 40 may be formed from one or more pieces of a hard material such as cardboard, plastic, wood, or metal. As shown in the top view, game board 40 has a top playing surface defining a plurality of game board areas 44 arranged along a first axis (horizontal in FIG. 1-A) by business complexity, and along a second axis (vertical in FIG. 1-B) by value. Game board areas 44 are arranged in a 3×3 array characterized by low, medium, and high business complexity along the first axis, and by low, medium, and high value along the second axis. Each game board area 44 is in turn subdivided into 3×3 subareas 46, each sized to hold a single playing piece as described below. In particular, game board areas 44 and their component subareas 46 are configured to allow an alignment of a player's playing pieces, as illustrated by the four exemplary player piece locations 54 in FIG. 1-A.

A set of business complexity visual markers 48 are disposed along the game board edge along the first axis, while a set of value visual markers 50 are disposed along the game board edge along the second axis. In the illustrated embodiment, business complexity visual markers 48 include a representation of a bicycle, automobile, and aircraft, and value visual markers 50 include representations of one, two and three stars representing low, medium, and high value, respectively. Each game board area 44 also includes a game currency profit visual marker 52 indicating a game currency profit characterizing the respective game board area 44. In particular, each marker 52 indicates a game profit or cost earner or expended by a player by moving a playing piece into, out of, and/or within the game board area or a subarea. In some embodiments, each marker may also indicate a game currency bonus generated by a piece located in that area and contributing to an alignment. As illustrated, markers 52 may be numbers.

FIG. 1-B shows another exemplary game board 40' for a business simulation board game according to some embodiments of the present invention. Game board 40' differs from the board shown in FIG. 1-A in that a set of business complexity visual markers 48' include representations of polygons having different numbers of edges, and in particular, a triangle, square and pentagon representing low, medium, and high business complexity, respectively. In some embodiments, the game board faces shown in FIGS. 1-A-B are provided on opposite faces of a common game board.

FIGS. 1-C-D show other exemplary game boards 40", 40"', respectively, for a business simulation board game according to some embodiments of the present invention. The illustrated board designs use different visual markers to denote complexity and value.

In some embodiments, a board may have axes that are radial rather than Cartesian (x-y). In such a configuration, the board may proceed from the outside in toward the center of a circular or oval board, or from the inside out.

In some embodiments, one or more transparent scenario layers may be overlaid on a game board in order to provide specific scenario and/or theme enhancements to the board. Each scenario layer may be formed by a transparent sheet of a material such as a plastic. FIGS. 2-A-H illustrate a number of such scenario layers, including layers representing a vertical industry or segment, such as an auto, pharmaceutical, and information technology industry or segment.

FIG. 2-A shows an exemplary information technology scenario layer 60 configured to be used with a board for a business simulation board game according to some embodiments of the present invention. FIG. 2-B shows the scenario layer of FIG. 2-A overlaid on the board of FIG. 1-B to form an assembly 62, according to some embodiments of the present invention. Scenario layer 60 includes depictions of information technology industry segments arranged along the first axis by business complexity, from computers (low complexity), to systems (medium complexity), to solutions (high complexity). Each scenario segment area covers a corresponding subset of game board areas characterized by a common business complexity.

FIG. 2-C shows an exemplary auto industry scenario layer 64 configured to be used with a board for a business simulation board game according to some embodiments of the present invention. FIG. 2-D shows the scenario layer of FIG. 2-C overlaid on the board of FIG. 1-B to form an assembly 66, according to some embodiments of the present invention. Scenario layer 64 includes depictions of auto industry segments arranged along the first axis by business complexity, from compact cars (low complexity), to family cars (medium complexity), to luxury cars (high complexity). Each scenario segment area covers a corresponding subset of game board areas characterized by a common business complexity.

FIG. 2-E shows an exemplary auto industry scenario layer 72 configured to be used with a board for a business simulation board game according to some embodiments of the present invention. FIG. 2-F shows the scenario layer of FIG. 2-E overlaid on the board of FIG. 1-B to form an assembly 74, according to some embodiments of the present invention. Scenario layer 72 represents the auto industry segments described with reference to FIGS. 2-C-D, and additionally includes explicit indicators of the directions of the business complexity and utility axes of the board.

FIG. 2-G shows an exemplary auto industry scenario layer 76 configured to be used with a board for a business simulation board game according to some embodiments of the present invention. FIG. 2-H shows the scenario layer of FIG. 2-G overlaid on the board of FIG. 1-B to form an assembly 78, according to some embodiments of the present invention. Scenario layer 76 includes a set of start formation markings 80, each sized to match an individual player piece, and each denoting a location of a starting position for a player piece at the beginning of the game. Scenario layer 76 further includes a bonus zone marking 82 defining an area of the board for which a given game bonus, such as a piece alignment bonus, is increased by a fixed amount and/or scaled by a factor (in the illustrated example, is doubled).

FIGS. 3-A-B-C show exemplary playing pieces 92, game currency pieces 94, and dice 96, respectively, according to some embodiments of the present invention. The various pieces may be made from materials such as plastics or metals. In some embodiments, at least some of the pieces may be made by 3-D printing. Playing pieces 92 include multiple collections of pieces, each collection being identical to the others except for a player identifier such as a piece color. For example, in a two-player setup, one set of pieces may be red, while another may be blue. Each collection of playing pieces is assigned to a corresponding player of a plurality of players. Each collection of playing pieces includes a plurality of playing pieces representing a business or economy comprising a plurality of business segments. Each playing piece represents one business segment, and each business segment is represented by multiple playing pieces for each player. In the illustration of FIG. 3-A, some playing pieces represent a low-complexity business segment, represented by a bicycle, some playing pieces represent a medium-complexity business segment, represented by an automobile, and some playing pieces represent a high-complexity business segment, represented by an aircraft.

Game currency pieces 94 include pieces of multiple denominations of game currency, such as 1, 10 and 100 game currency units. The game currency pieces 94 are received and spent by players during gameplay, as described below.

Dice 96 include one die defining random business complexity event outcomes, and one die defining random value event outcomes. Two exemplary designs are illustrated in FIG. 3-A for a business complexity die: a die with bicycle, auto, and aircraft faces, and a die with triangle, square, and pentagon faces. The two die designs correspond to the exemplary board designs and corresponding business complexity representations shown in FIGS. 1-A-B. A die defining value event outcomes has one, two and three-star faces. Each business complexity and value outcome is represented by two identical faces on a corresponding die, or a one in three (2/6) chance of occurrence when the dice are rolled. The random event outcomes determine a number of allowable game actions as described below, including the placement of playing pieces on the board, and the movement of playing pieces along the board.

In some embodiments, other random event generator structures may be used instead of or in conjunction with dies. For example, one or more rotating wheels/arrows, or electronic random event generators, may be used to generate random event outcomes used in gameplay.

FIGS. 4-A-B illustrate an exemplary bottom tray 100 of a playing piece case according to some embodiments of the present invention. FIG. 4-A shows top and side views of bottom tray 100 by itself, while FIG. 4-B illustrates bottom tray 100 holding a collection of playing pieces 92. As illustrated, the collection includes nine low-complexity playing pieces, six medium-complexity playing pieces, and three high-complexity playing pieces.

FIGS. 4-C-D illustrate an exemplary cover 102 for a playing piece case according to some embodiments of the present invention. Cover 102 is sized to fit together with bottom tray 100 to form the playing piece case.

FIGS. 5-A-C illustrate an exemplary bottom tray 104 of a game currency case according to some embodiments of the present invention. FIG. 5-A shows top and side views of bottom tray 104 by itself, while FIGS. 5-B and 5-C show top and side views, respectively, of bottom tray 104 holding game currency pieces.

FIG. 5-D illustrates an exemplary cover 106 for a game currency case according to some embodiments of the present invention. Cover 106 is sized to fit together with bottom tray 104 to form the game currency case.

In some embodiments, a set of printed game-playing instructions are included together with a game board, playing pieces, game currency pieces, and dice in a board game set or kit provided to end users. For an electronic system, the instructions may be displayed electronically and interactively. The game-playing instructions provide guidance on how to play a business simulation board game using the board game set described above. In particular, the game-playing instructions describe rules for placing playing pieces on the board, moving playing pieces along the board, and removing playing pieces from the board, as well as game currency expenditures and revenue associated with playing piece actions and alignments in different stages of the game. In some embodiments, the game is divided into three stages, as described below: an expansion stage, a restructuring stage, and a conclusion (winding-down or closing) stage.

In some embodiments, the instructions provide a high-level description of the game, a quick-start summary of the main rules for playing the game, as well as detailed, lower-level instructions for playing the game. An exemplary high-level description of the game may include text such as: "You are the CEO. Hired to run a company, you will oversee its expansion, restructuring, and orderly closing. You will enter and exit multiple markets, introducing and retiring several products. With the overarching goal of making the most of your initial resources, you will make the sum greater then its parts. But you are not alone. Your performance will be compared to that of your opponent, a fellow CEO, who is engaged in the same quest. Identical resources, different company. In direct competition with some of the products in some of the markets, you will both strive to generate as much cash as possible, which is the only measure of success that counts in the end. The CEO with the most cash on the table wins. Think big, and good luck!"

An exemplary quick-start summary of the rules may include a rule set such as the set described below: Use this simplified view of the game mechanics and the condensed instructions to start playing immediately. (1) Be the CEO™. Think big: several products, multiple markets, many decades, and lots of streams of cash. (2) Run your company as a collection of ofmos ('offering-market cosmos'), which are virtual business worlds characterized by an offering (product, service, or both) and a set of customers. (3) Start with 18 ofmos pieces (9 bikes, 6 cars, 3 planes), initially inactive. Think of them simplistically as products to be launched, and keep them in their tray for now. (4) Use your initial budget of $165 to get started. Also give your opponent $165 and leave the rest in a general pool of money. (5) Launch your products, operate those businesses, and then orderly exit by discontinuing all of your, now obsolete, products. (6) The player with most cash at the end wins. (7) Use the four available actions: launch a product (introduce an ofmos), operate a business (move an ofmos), discontinue a product (exit with an ofmos), and no-action to achieve your goal. (8) Also use synergies (alignments of ofmos) to share resources among businesses, reduce costs, and generate even more returns. (9) Manage your ofmos on a map defined by the product's complexity (3 categories: bikes, cars, planes) and its perceived value (3 categories: one notch, two notches, three notches). (10) The map consists of 3×3 areas, each with 3×3 positions. Calculate profits and bonuses, as well as investments and fees, based on the number associated with each area. (11) Place the board with the value axes toward the players and start.

(12) Use the JUMPSTART option first. Pay $45, as investment, then take turns to launch 9 products (3 in each category), without rolling dice. Place one piece in each of the 9 areas, and only in the available positions from the top row inside each area. (13) After that, continue the EXPANSION stage with the objective of launching all of your 18 products (ofmos), by rolling both dice to determine the area in which an action can be taken. (14) To launch a product (introduce an ofmos), pay the amount indicated by the selected area, as investment, then place the piece in one of the three top positions of that area. (15) At this point, you can also launch a product and lower a competing product's value (push a competing ofmos one position down, if it occupies an entry position, and is not blocked). (16) Operate a business (move an ofmos downward) and generate the profit indicated by the originating position. Think of it as the return earned by the product and the business around it in a year. (17) Operate a business and engage in product innovation (move an ofmos laterally inside a complexity category), which is done with no cash transaction, as the profit is offset by the innovation costs. (18) Squeeze out a competing product (take out a competing ofmos with a downward move), while still collecting the operating profit. Note that you cannot eliminate ofmos with lateral moves. (19) Retire a product and exit that business (exit with an ofmos only from the board's bottom row), which comes with the profit from operation plus an exit bonus of $3. That becomes a dead business.

(20) Create a new synergy among your businesses (create a new alignment by bringing three or more horizontally-neighboring ofmos together, for the first time) when possible. Earn the profit from the last business operation (move) or deduct the investment, if a new product was launched (introduction), then add the numbers corresponding to each position of each product in the synergy. (21) Widen an existing synergy (create an addition to an existing alignment by attaching one or more ofmos to it). Earn the profit from the last business operation (move) or deduct the investment, if a new product was launched (introduction), then add only the numbers that correspond to each position of each product that was added to the exiting synergy. (22) Sometimes, choose not to act. For intentional no-actions, pay a fee of $9. Unintentional no-actions in the Expansion stage require a fee equal to the number associated with the selected area. In both cases, roll the dice again, taking no more than three turns.

(23) The RESTRUCTURING stage begins after the last product from both players is launched (the last idle ofmos is introduced on the board). Moving forward, each player rolls only one of the two dice per turn, which offers an entire category or three areas to choose from for an action to be taken. At every turn, you can choose the dice that offers the best possible outcomes. (24) Your objective here is to make two mandatory product conversions. In no particular order, you have to swap three (3) operational bike businesses for two (2) dead car businesses, and two (2) operational car businesses for one (1) dead plane business. With only one conversion per turn allowed, the dead (out of the game) products will be brought back as capabilities to be launched later (idle ofmos to be introduced later), one at a time. (25) For a conversion to take place, all operational businesses (active ofmos) to be exchanged must be located in the category indicated by the die, and the dead ones must be already out. (26) Also, because players roll only one die in this stage, the penalty fee for the unintentional no-actions is now calculated as the lowest number of the three associated with the areas indicated by the die. (27) Launch the three products from the conversions (introduce the three idle ofmos) in one of the three areas indicated by the die, and finish the stage, independently, with the last launch.

(28) Enter the CONCLUSION stage and freely operate businesses (move ofmos) or retire products (exit with ofmos from the bottom row), one action per turn, without rolling dice. (29) In this stage, enhance your product innovation (move an ofmos laterally across categories), with no additional costs. (30) Also, you can now employ value innovation (move an ofmos upward) to increase a product's value and your overall potential. The cost (payment) is calculated as the number corresponding to the originating position plus a fee of $3. (31) The game ends when all products belonging to a player are retired (all ofmos are taken out). Count the money, ignoring the still operational businesses. The CEO with the most cash wins.

FIG. 6-A shows an exemplary image which may be used as part of a set of instructions in order to graphically convey available moves and associated game currency consequences according to some embodiments of the present invention. An annotated board image 200 illustrates available moves and associated game currency costs and revenue. Costs are represented as negative numbers, while revenues are represented as positive numbers. FIG. 6-B shows an associated table 202 illustrating the available moves in list form, organized by whether the moves correspond to incoming or outgoing game currency.

In some embodiments, a detailed set of playing instructions include instructions and associated explanations as described below. Such playing instructions may be divided into sections including Introduction, Goal, Elements, Setup, Actions, Alignments, and Gameplay. Exemplary text suitable for such sections according to some embodiments is described below. The instructions below are illustrative of certain embodiments, and are not intended to limit the scope of the invention.

Instructions: Introduction

In some embodiments, exemplary introductory text includes text explaining that OFMOS is a strategy game that simulates the task of running a corporation over an extended period of time. Abstract in nature, the game is suited for adults and young adults, with or without business experience, pitting against each other two players. As fellow Chief Executive Officers or CEOs, they are commissioned with launching, expanding, restructuring, and then exiting business entirely with their respective companies. All with the overarching goal of returning the highest amount of cash at the end of the mission. The game is based on a perspective that views a company as a dynamic collection of profit-making entities called ofmos, which are virtual business worlds defined by an offering (product, service, or both) and a set of customers with the same buying and usage behavior relative to that particular offering. Accordingly, viewed from a higher level, the job of the CEO becomes primarily one of managing ofmos. And that is a foundation that makes the game fun, while putting to test the players' probabilistic thinking and their complexity mind set.

Instructions: Goal

In some embodiments, exemplary text describing the goal of the game may include text such as the explanation below. In the game, the two players are challenged to make the most of their resources, in an environment that gradually shifts from probabilistic to deterministic, when the desired actions happen with a hundred percent certainty. They both start with an identical collection of idle ofmos that defines their respective companies, and which represent the initial set of capabilities or potential businesses. In addition, they also receive the same amount of money, in cash, to cover the necessary investments for transforming the idle ofmos into active businesses. Throughout the game, the two players strive to maximize their accumulated cash, which is driven by the profits that result from the operation of each individual ofmos, plus the bonuses that are awarded when certain ofmos formations are achieved. At the same time, they are also trying to prevent each other from doing so. It is a duality that stems from the fact that each player's ultimate goal is to end the game with the most cash on the table. Players could concede early, or run out of cash necessary to be able to take an action, in which case they lose. However, when the game is played until one of the players exits business with all ofmos, or the common pool of money runs dry, the one with the most cash at that moment wins, regardless of who moves last.

Instructions: Elements

In some embodiments, exemplary text describing the elements of the game include text such as the explanations below regarding the concepts of Ofmos, Ofmos Map, and Profit.

i. Ofmos: ofmos: noun, same form for singular and plural; short for offering-market cosmos. An ofmos is a virtual business world defined by an offering and one or more customers with the same acquisition-and-usage behavior relative to that particular offering. Covering all types of offerings and customers, it can be seen as a building block in business management by enabling a perspective where any company can be viewed as a collection of ofmos. Ofmos are integrated with a market segment. In a broader sense, an ofmos can be viewed as a whole created by a business unit and a market segment, which itself is characterized by a specific customer behavior associated with the product that defines the said business unit. So a single business unit could translate into multiple ofmos, one for each distinct market segment in which the defining offering is being sold. For a single company, then, there could be at least one ofmos defined by each of its offerings, regardless of their type. According to this underlying rationale, one feature of the game are the ofmos pieces, which as collections or sets represent each respective company ran by the each player, as a CEO. The game simplifies the reality by reducing the entire spectrum of offerings to only three categories, symbolically defined as bikes, cars, and planes. The same categories may also be indicated through the use of basic geometric shapes: triangle (three sides), square (four sides), and pentagon (five sides).

The three categories of offerings are expressed in the design of the playing pieces by three symbolic representations of the size of the associated customer base: three customers for the bike offerings, two customers for the car offerings, and one customer for the plane offerings. Together, the three sets of symbols illustrate the progression in the complexity of the offerings and the operations behind them, as well as the potential reach among the customers that comes with each level of complexity. The sets of symbols also illustrate the inverse proportionality between the two progressions. The more complex the offerings and the business operations are, the smaller the customer base inside that ofmos is. The ofmos pieces also illustrate the fact that an offering's inherent nature has an impact on its business potential. The easier it is to make and sell an offering, the higher the chance that more customers will buy it. In turn, companies will generally tend to make and sell more of the simpler offerings to more customers. This approximation of the real world is illustrated in the game, where each company is defined by 9 bike ofmos, 6 car ofmos, and 3 plane ofmos. It is a simplistic reflection of how these symbolic types of ofmos tend to be distributed not only inside companies, but also generally in a particular economy. Ofmos can exist in three different states in the game. They can be (1) idle, encapsulating capabilities that have not been materialized yet. Although inactive, they are considered to be in the game. Then ofmos can be (2) operational, which means that the business worlds that they represent are active, generating streams of profit or loss. Such ofmos are also considered to be in the game. Finally, ofmos can be (3) dead or out of the game, which means that the company has exited those businesses, on its own or pushed out by the competition.

ii. Ofmos Map. A second feature of the game stems from the fact that an ofmos is linked not only to the company's internal environment, but to the marketplace as well. This characteristic of an ofmos suggests that its business potential is driven not only by the inherent nature of the offering and the supporting operations, but also by the utility or perceived value that customers derive from that offering. And so, every ofmos can be characterized by two dimensions or coordinates: one that gives its complexity level, and another one that gives its value level. Accordingly, every active ofmos can be represented on a map defined by the offering's complexity continuum and the offering's value continuum. The resulting two-dimensional space creates then a common frame of reference on which all ofmos can be positioned and plotted, as their position evolves. While ofmos can be placed or positioned inside this space, which is an expression of a company's intent (top-down approach), their evolving position is mostly plotted or tracked, which is an expression of a company's emergent state of affairs (bottom-up approach). Called the Ofmos Map, this space is translated into the game board, as a simplified embodiment. Each continuum is replaced by an axis with 9 division (think scale of 1 to 9), resulting in a map with 9×9 positions, on which the ofmos can be placed. Further, the positions along each axis are also grouped in sets of three, creating complexity categories (bike, car, and plane; or triangle, square, and pentagon) and value categories (one notch, two notches, and three notches). For convenience, and reflecting the overall dynamics of the ofmos pieces throughout the game, the two edges of the board that indicate the 'value' dimension (one notch, two notches, and three notches) can also be referred to as the sides. Similarly, the edge that indicates the 'complexity' dimension (bike, car, and plane) and connects to the 'three notches' end of the 'value' axes can be referred to as the top of the board. Accordingly, the opposite edge can be referred to as the bottom of the board. Each of the nine areas, defined by the complexity and value categories, is marked by a number, which represents the profit associated with each of the nine positions inside it ($1 to $9). A view at this level offers the CEO a simpler map of 3×3 (9) areas to manage the portfolio of ofmos. Additionally, the three positions constituting the top row inside an area are also considered entry or landing positions, where idle ofmos can be activated or introduced on the board.

iii. Profit. A game taking 60 to 90 minutes to play may simulate corporate activity spanning several decades in real life. The focus is on the big picture and features of a successful business are embedded into the game mechanics, assumed to exist in the background. The simple fact that the two companies last very long periods of time suggests that they are healthy companies, being customer oriented and adept of various best practices. Nevertheless, the longer the time frame, the more visible the money side of business becomes. While generations of offerings come and go, to stay in business, companies must continuously generate revenues that exceed the expenditures or cost of doing business. Essential in keeping an organization operational or running over long periods of time, the difference between revenue and cost is simply described as profit (sometimes also referred to as return). Profits in the game are expressed exclusively with cash (the most ready-to-use form of money), even though in real life the financial side of business tends to be more complex. And it is the same for all other monetary transactions: investments, bonuses, and penalties. The currency chips are available in denominations of $1, $10, and $100. They are simplified expressions of $1 million, $10 million, and $100 million, which more accurately represent the amounts of money that long-lasting companies tend to deal with.

Instructions: Setup

In some embodiments, exemplary text describing the elements of the game include text such as the explanations below regarding the game setup for two modes: Normal and Scenario.

The board game OFMOS can be played in two general modes: Normal and Scenario. In the Normal Mode, the players experience the classic version of the game. In the Scenario Mode, the game is played by the same rules, with the addition of a Scenario Layer that is placed on top of the board. As the name suggests, the Scenario Layers bring additional context to the game, ranging from visual placements of the gameplay in particular industries, all the way to pre-determined start scenarios and "hot" zones on the map with additional bonuses or penalties.

a. Setup for Normal Mode. To set up the game for the Normal Mode, the board is placed with Face 1 up on a stable surface, with the value axes toward the players. If the players are not positioned diametrically opposed across the board, but slightly shifted to one side of it, it is recommended that the 'one notch' end of both axes (or what could be referred to as the bottom of the board) should point in the direction of the two players. Each player is then given $165 (15 chips of $10, and 15 chips of $1), as the initial fund. The rest of $1,110 (10 chips of $100, 10 chips of $10, and 10 chips of $1) should remain easily accessible, as it represents the entire capital floating in the marketplace. Whether collecting profits and bonuses, or making payments as investments and fees, the players will be using this pool of money exclusively, with no direct exchanges between the two of them. Borrowing, of any kind, is not allowed. Also, a player cannot hoard chips of smaller denominations to intentionally prevent the other player's completion of a cash transactions. The elements used to play the game in the Normal Mode are the two sets of ofmos pieces, the board (Face 1), the two dice, and the money chips. In order to improve the play experience and to reduce the game's physical footprint, players can also use the boxes in which the ofmos pieces and the money chips are stored. The bottom tray of the box for the ofmos pieces could be used as the tray for the idle pieces, while the top cover could be used as the receptacle for the dead or out-of-the-game ofmos. Furthermore, the top cover of the money chips box could be used as a dice-rolling tray. After the initial funds have been allocated, the players could amicably decide on the color of their respective companies and on who goes first. Or, alternatively, they can roll the two dice, which will indicate one of the nine areas on the board, each with an associated profit number. Given that the two numbers resulting from the rolls are different from each other (otherwise, the players will roll again), the player with the highest number will pick a company color and will go first, using that same winning roll to determine where the first action will be taken.

At this point, the players enter the game's EXPANSION stage, which is followed by the RESTRUCTURING stage and, in the end, the CONCLUSION stage. As an alternative way of starting the Expansion stage, they could also choose the JUMPSTART option, which allows them to distribute their respective sets of ofmos more uniformly across the Ofmos Map. With the additional benefit of shortening the duration of the first part of the game, the alternative start is particularly useful to those who are new to the game. The alternative start is particularly useful when the game is played in the Scenario Mode. Lastly, the ofmos pieces have been deliberately designed to simultaneously feature two sets of icons, so they can work for both the Normal Mode and the Scenario Mode. Consequently, because they feature the icons triangle, square, and pentagon, respectively, which are also the icons used on the board's Face 2, players can choose to play the Normal Mode on that face as well. Played without a scenario layer, which is used for the Scenario Mode, and with the die 'offering's complexity—abstract' instead of the die 'offering's complexity—product,' this is the most general version of gameplay, enabling players to focus on the raw mechanics and the pure strategy required, without any reference to the business world and management theory.

b. Setup for Scenario Mode. The setup for the Scenario Mode is almost identical to the setup for the Normal Mode. Instead of Face 1 of the board, the players will use Face 2, which uses the abstract symbols of triangle, square, and pentagon for the offering's complexity axis. The die that features those same symbols ('Complexity—Abstract' Die) will replace the die that feature the specific products bike, car, and plane ('Complexity—Product' Die). One change lays in the use of the scenario layer (three scenario layers are included in the game set), which provides a visual mechanism that adds additional context to the gameplay. The types of context range from simple illustrations that place the sets of ofmos in very specific industries or industry segments to predetermined starting formations as well as "hot" zones that trigger additional bonuses or penalties. Made of a transparent sheet of plastic, the scenario layer is mounted on top of the Face 2 of the board, providing an additional layer of visual information to the Ofmos Map. Additionally, each scenario layer might come with a brief real-world business case that further deepens that particular context. The Scenario Mode is designed to be played with the Jumpstart option. Adding an additional layer of context this mode of playing is particularly valuable when it is used in a formal or informal education setting.

Instructions: Actions

In some embodiments, exemplary text describing the elements of the game include text such as the explanations below regarding game actions, including introduction of a playing piece, operation of a playing piece, exit of a playing piece, and no action.

Throughout the game, the two players take turns and complete one action per turn. While ofmos can be idle (in the game, as capabilities that have not been materialized yet), active (in the game, operational), or out of the game, the two CEOs will perform a balancing act between the management of their respective portfolio and the handling of the direct competition that could emerge between ofmos from the two companies. And for that, they have four actions at their disposal. In the first two stages, constrained only by the availability of pieces and positions, they can choose to (1) introduce an ofmos, (2) move an ofmos, (3) exit business with an ofmos, or (4) take no action and roll again. In the last stage of the game, the choices are reduced to moving an ofmos or exiting business with an ofmos.

a. Introduction of an Ofmos. i. Introduction in open entry position. To convert an idle ofmos into an operational ofmos, which represents materializing a capability into an operating business, the players roll dice to determine an area on the map, where the ofmos can be placed. Once an area is chosen, an ofmos from the corresponding 'complexity' category (bike, car, plane) can be added in any open position in the top row inside that area. It is an action that requires a payment (think investment) equivalent to the profit associated with the entry position (the same number that is associated with the entire area). Throughout the game, ofmos can be introduced only in their respective category. ii. Introduction with push of competing ofmos When introducing a new ofmos, players can also choose to push a competing ofmos that occupies an entry position (any of the top three positions in an area), if the position below it is empty. Since only one ofmos per position is allowed, the ofmos from the opposing team is being pushed downward, while the newly added ofmos takes its place. However, the players cannot push their own ofmos or a competitor's ofmos that is blocked by any other ofmos currently in the position below it. And as it is always required, the introduction of a new ofmos must come with the mandatory investment. During the game, most ofmos from the two companies are not in direct competition with each other, except for the situations like the one described above. In those cases, the two ofmos are defined by the same offering and have customer bases from the same total market. So when the new ofmos is introduced, the perceived value of the offering within the incumbent ofmos drops, and that ofmos is pushed into the next lower-value position on the map.

b. Operation of an Ofmos. All active ofmos, which have been placed on the board, represent operational business worlds. As the customers inside an ofmos buy the defining offering, the ofmos generates revenue and profit. Also, as the offering becomes more prevalent among the customers, its perceived value or utility drops. And that means that the value associated with ofmos drops, which would translate to a change in position on the board. In the game, the two players can deliberately change the position of their ofmos during their respective turns only. These actions are called moves, and there are three possible moves: downward moves, lateral moves, and upward moves. Also, as a general rule, when acting upon an ofmos, the generated profit or loss is the profit number associated with the originating position, not the destination.

i. Downward Move. Moving an ofmos downward is an expression of a phenomenon called commoditization, which is a natural consequence of operating the business in that particular business world. As the knowledge about the defining offering spreads within the marketplace, its utility shrinks towards its core functionality. Therefore, the downward move is the most common move, which is done one position at a time, and is accompanied by the generation of profit from operating the business. In the game, ofmos from the two companies inevitably land in each others' commoditization path. While the introduction of a new ofmos can only push a competing ofmos that occupies an entry position, a downward move can actually overtake or take out a competing ofmos. And since the ofmos being moved has already been on the map, the move generates the operating profit as well. In real life, this situation occurs when a company lowers the offering's price to increase the market penetration, thus squeezing out the competing offerings of a lower perceived value.

ii. Lateral Move. The lateral move of an ofmos is an expressions of the company's innovation efforts. In order to fight against the diminishing returns that come with the offering's commoditization, or simply to try to avoid direct competition, the company can choose to alter that particular offering. An increase in complexity translates into a one-position move to the right, while a simpler offering means a one-position move to the left. In both cases, these efforts are called innovation and they come with a cost. However, since the cost of innovation is cancelled out by the profit resulting from operating the business, the lateral moves come with no profit or fee to be paid out. Also, as a rule, it is not possible to 'push' or overtake an ofmos from the opposing company with a lateral move.

iii. Upward Move. The upward move relates to the rather rare situations when the entire business environment is significantly transformed by events like natural disasters, wars, or socio-political changes. Characterized by the increased scarcity of a particular offering, or the emergence of unexpected customer needs relative to that offering, those external transformations lead to an increase in the offering's perceived value within the same market, without any actual changes to the offering. In the game, this translates into an upward move, possible only in the last stage. To make the move, players have to pay a fee of $9 plus the equivalent of the profit associated with the originating position. And similar to the lateral move, it is not possible to 'push' nor overtake an ofmos from the opposing company.

c. Exit with an Ofmos. As ofmos commoditize toward a lower value, they eventually reach the last row of positions at the bottom of the map. Following their introduction, which comes with an associated investment, ofmos evolve and generate gradually diminishing profits, following a pattern that resembles what is typically referred to as product life cycle. And so, it is only from the bottom row of positions that players can choose to deliberately exit business with an ofmos. These moves generally represent the company's retreat from a business space, in which the offering has reached irrelevance or obsolescence. Equivalent to a move downward off of the board, the exit brings in the profit associated with the last position on the board, plus a 'life cycle completion' bonus of $3. Nevertheless, there is an exception to the above rule. A special case of deliberate exit takes place in the game's second stage. As part of their respective companies' restructuring, the players have to exchange some of the ofmos with a lower potential for higher-potential ofmos. And that means divesting or getting out of a still lucrative business.

d. No-Action. i. Intentional No-Action. In some cases, the players might opt for not taking an action. In other words, no-action is an action. Rather than going with a less-desirable outcome, resulting from introducing an ofmos, moving an ofmos, or exiting business with an ofmos, a player can intentionally choose not to move and roll the dice again by paying a penalty of $9. It is an option available only in the first two stages of the game. And, regardless of the stage, the general rule is that there should be no more than three consecutive combined intentional and unintentional no-actions are allowed. ii. Unintentional No-Action. In the first two stages of the game, there are instances where players might not have pieces to introduce or move inside the space indicated by the dice. In the Expansion stage, unintentional no-actions are penalized by an amount equal with the area's profit. In the Restructuring stage, and the lowest profit inside the selected category.

Instructions: Alignments

In some embodiments, exemplary text describing the elements of the game include text such as the explanations below regarding alignments, including new alignments and adding to an existing alignment.

One of the basic tenets in business is the notion of economies of scale, which describes the fact that the more of the same offering you make or sell, the higher the efficiencies in operations and thus the higher the resulting profit. It is a principle that is even more relevant when dealing with multiple offerings and multiple markets, because corporations strive to reach a state that could be described as "the whole is greater than the sum of its parts." Consequently, one of the important skills in running a corporation is creating synergies, or sharing resources with the goal of generating increased efficiencies. And in the game, that is expressed through alignments, which are formations of three or more horizontally adjacent (neighboring) ofmos, within or across offering categories. Alignments are a good approximation of synergy because the horizontally adjacent positioning of the ofmos in an alignment implies that their defining offerings have similar levels of complexities, structurally as well as in terms of supporting operations. While that alone does not mean that the offerings are related, the fact that they are also perceived as similar in value to the customers makes it highly probable that those ofmos do share offering components or processes, or both. And to get to these states, players have two option: new alignments and additions to existing alignments.

a. New Alignment. A new alignment is achieved when one ofmos is moved to create a formation of three or more adjacent ofmos. And that can be done not only by moving (downward, lateral, or upward) existing pieces on the board, but also by introducing a new ofmos. As a key tool in the CEO's arsenal, a new alignment is rewarded with a bonus which is the sum of the profits associated with the positions of all the ofmos in alignment, in addition to the profit generated by the move (or minus the cost of investment, if a new ofmos is being introduced.)

b. Addition to an Existing Alignment. The addition of ofmos to an existing alignment is also important and, therefore, rewarded. As with the new alignment, the additions can be achieved by moving an existing ofmos downward, lateral, or upward, or by introducing a new ofmos. The three or more adjacent ofmos that are in alignment prior to the player's turn are considered an existing alignment. Only the ofmos that are being added will count for the bonus, which is calculated by adding the profit associated with the final positions of the newly added ofmos. The profit from the move or the cost of the ofmos introduction will also be added. If two existing alignments are merged, the one with a lower potential bonus will be considered the exiting alignments and bonus will be rewarded for all the other ofmos.

Instructions: Gameplay

In some embodiments, exemplary text describing the elements of the game include text such as the explanations below regarding game play, including the three stages of the game: expansion, restructuring, and conclusion.

OFMOS mimics the activity of a company over several decades. Just like real-life CEOs, the players take their respective companies from inception to completely exiting business, adding and divesting several offerings in various markets in the process. The game consists of three specific stages: Expansion, Restructuring, and Conclusion. And each stage has specific objectives, which are described below. These instructions refer to the Normal Mode of playing.

Stage 1: EXPANSION. i. Objective. In the first part of the game, the main objective is to convert all idle ofmos into active, operational ones. Both players have to fully deploy the capabilities of their respective companies, which simply means placing all the pieces from the 'capabilities' tray on the board. Nevertheless, it is important to do so while strategizing for the entire game, keeping in mind the objectives and specifics of the next two stages. ii. Specifics. This is the stage when the company is expanding by launching new offerings and entering new markets. Naturally, it is a stage where a CEO's intent materializes with a lower probability. As a reflection of that reality, the moves in the Expansion Stage will be determined by the roll of two dice, which means that a player's chance of selecting a particular area for making a move is 1 in 9 (or 11.1%). The Expansion Stage ends when both players place their ofmos on the board, meaning the stage ends with the move in which the last ofmos from both companies is moved out of the 'capabilities' tray. That also means that the first player to place all ofmos on the board will continue to roll two dice until the other player activates the entire portfolio as well. iii. The JUMPSTART (Optional) The first stage of the game is characterized by a higher dependence on lack or chance, so the players can reduce some of that uncertainty by choosing the Jumpstart option, which is an alternative way of beginning the stage that does not involve dice rolling, as is required throughout the rest of the Expansion stage. The players each make a one-time aggregated payment of $45 (=$1+$2++$9), then place one ofmos at a time, one in each of the nine areas. They place one piece per turn, in any of the available positions at the top of each area, without the option of pushing downward competing ofmos. This approach to starting the Expansion stage offers the players a more balanced distribution of their respective portfolios of ofmos on the board, while also slightly reducing the duration of the Expansion Stage. After the introduction of the nine ofmos, the players continue the Expansion stage by rolling the dice at each turn.

Stage 2: RESTRUCTURING. i. Objective. The main objective in the second part of the game is to execute two mandatory conversions of ofmos: (1) three active 'bike' ofmos exchanged for two out-of-game 'car' ofmos, and (2) two active 'car' ofmos exchanged for one out-of-game 'plane' ofmos. Here, players have to restructure their companies by divesting businesses with a lower potential, while adding new ones that promise better returns. In reality, for companies that strive to achieve enduring success, this is an ongoing, never-ending process. ii. Specifics. The Restructuring Stage starts after the last ofmos from both of the 'capabilities' trays are placed on the board, which marks the end of the first stage. At this point in the game, as in real life, the two players and their respective companies have been in business for some time, gaining valuable experience. So their actions are determined by the roll of a single die, with the freedom of choosing one of the two dice, at each turn. The choice of a single die, whether the one that selects a 'complexity' category or the one pointing to 'value' category, increases the chances of selecting a desired area to take an action to 1 in 3 (or 33.3%). And, unlike the Expansion Stage, the Restructuring Stage ends for each player, individually. In other words, once a player's conversions are made and the last out-of-game ofmos that became a capability is introduced on the board, that player alone advances into the last stage of the game, where new objectives and specifics come into play. iii. Conversions. The two mandatory conversions (three active 'bikes' for two out-of-game 'cars', and two active 'cars' for one out-of-game 'plane') are free and can be made in any order. However, making a conversion requires that (1) all of the active ofmos that need to be taken out of the game for that conversion must be positioned within the space indicated by the die, and (2) all of the out-of-game ofmos that need to be brought back into the 'capabilities' tray must be out already. It is an exchange that takes place in one turn, and is the only action available to the player. The ofmos that are brought back from out of the game and into the 'capabilities' tray can be introduced on the board at a later turn, not necessarily the one immediately following the conversion. As in the earlier parts of the game, the idle ofmos can be introduced (1) only in the space indicated by the dice, (2) in the corresponding category, and (3) with the required investment associated with the area of entry. Nevertheless, since the players roll only one of the two dice at this stage, they can choose any of the three areas of entry covered by the category indicated by the die (either offering category or value category) for their action.

Stage 3: CONCLUSION. i. Objective. In the last stage of the game, the players operate their remaining active ofmos, advancing toward exiting business completely, and thus concluding their mission. But, just like real-life executives strategically divest some of their businesses, so do the players must keep in mind the big picture. Guided by the overarching goal of accumulating the highest amount of cash at the end of the game, they must carefully balance (1) the efforts of maximizing the possible returns from their existing portfolio, which can be done through all the available moves, alignments, and exits, and (2) the efforts of minimizing the opponent's potential. ii. Specifics. The Conclusion Stage starts, for each player individually, after the last idle ofmos that resulted from the mandatory conversions of the second stage is placed on the board. From this point on, the players do not roll dice anymore. The intent is now materialized with 100% probability, reflecting a real-world business environment, where the CEO and the company have been around for some time. The players can now use lateral moves to cross the offering categories, which won't carry any associated cost or bonus, like any lateral move. In addition, they can make upward moves, which require the payment of a fee equal to the profit associated with the originating position plus $3. In addition, the intentional no-actions are not permitted anymore. So, players have to take an action every time it is their turn. iii. End of the Game. Throughout the game, players might concede at any time, either voluntarily or because they ran out of cash and cannot execute any subsequent action. However, the game typically ends when one of the players exits business with all ofmos. Particularly, it ends with the move that takes out the last ofmos from the board. The other player's active ofmos remaining on the board cannot be converted into cash, and do not account toward the player's final score. At this point, the two players count their accumulated cash, and the winner will be the one with the most money on the table.

In some embodiments, an electronic counterpart of a business-simulation board game as described above may be implementing using one or more computer systems, locally on a single client or in a network environment, as described below.

FIG. 7-A shows an exemplary system configuration including a plurality of client systems 512 and a game server system 516, all interconnected by a communication network, according to some embodiments of the present invention. The communication network may be a wide area network such as the Internet. Parts of the communication network may include a local area network (LAN).

Client systems 512 receive online content from game server system 516, and transmit player commands and/or associated data to game server system 516. Exemplary client systems 512 may include personal computer systems, mobile computing platforms (laptop computers, tablets, mobile telephones), entertainment devices (TVs, game consoles), and any other electronic device comprising a processor and a memory and capable of rendering online content. Each server system 516 generically describes a set of interconnected physical (hardware) computing systems, which may or may not be in physical proximity to each other.

FIG. 7-B shows an exemplary hardware configuration for a system such as client systems 512 and/or game server system 516 according to some embodiments of the present invention. Such a system includes set of physical devices, including a hardware processor 524, a memory unit 526, a set of input devices 530, a set of output devices 532, a set of storage devices 534, and a set of network adapters 536, all interconnected by a controller hub/system bus 538.

Processor 524 comprises a physical device (e.g. a microprocessor such a a multi-core integrated circuit formed on a semiconductor substrate) configured to execute computational and/or logical operations with a set of signals and/or data. In some embodiments, such operations are delivered to processor 524 in the form of a sequence of processor instructions (e.g. machine code or other type of encoding). Memory unit 526 may comprise computer-readable media (e.g. DRAM, SRAM) storing instructions and/or data accessed or generated by processor 524.

Input devices 530 may include computer keyboards, mice, and microphones, among others, including the respective hardware interfaces and/or adapters allowing a user to introduce data and/or instructions into the respective system. Output devices 532 may include display devices such as monitors and speakers among others, as well as hardware interfaces/adapters such as graphic cards, allowing the respective system to communicate data to a user. In some embodiments, input and output devices share a common piece of hardware (e.g., touch-screen). Storage devices 534 include computer-readable media enabling the non-volatile storage, reading, and writing of software instructions and/or data. Exemplary storage devices include magnetic and optical disks and flash memory devices, as well as removable media such as CD and/or DVD disks and drives. Network adapters 536 enable the system to connect to an electronic communication network, and/or to other devices/computer systems.

Controller hub 538 represents the plurality of system, peripheral, and/or chipset buses, and/or all other circuitry enabling the communication between the processor of each respective system and the rest of the hardware components illustrated in FIG. 7-B. In an exemplary configuration, controller hub 538 may comprise a memory controller, an input/output (I/O) controller, and an interrupt controller. Depending on hardware manufacturer, some such controllers may be incorporated into a single integrated circuit, and/or may be integrated with the processor.

FIG. 8 shows an exemplary sequence of steps performed to implement a business simulation game on a computer system according to some embodiments of the present invention. In a step 300, a display of a game board, associated playing pieces and player scores as described above is rendered on a display device. In a step 302, a user interface configured to receive player input is rendered according to the current player's turn and the phase of the game. In a step 304, random events for the game play are generated. As a skilled artisan would understand, in the computer context random events may actually be pseudo-random events generated according to predetermined methods known in the art. The term random is used herein to refer to both genuinely-random events and pseudo-random events generated by a computing device. In a step 306, a user interface is used to receive user input on game action as described above. In a step 308, player scores are updated, a determination is made whether the game has ended, and the process proceeds again to step 300.

Figure 9:
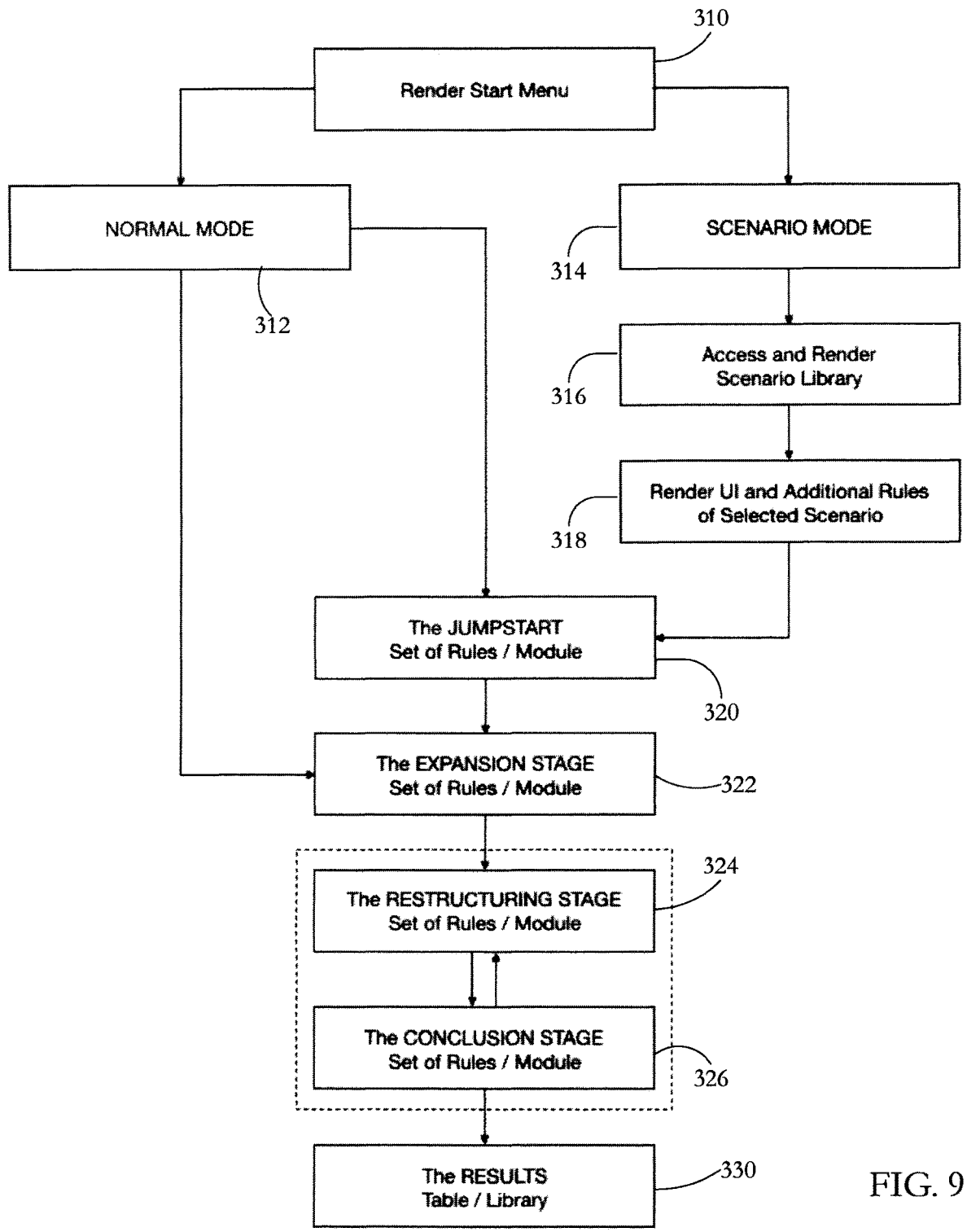
FIG. 9 shows an exemplary sequence of steps and associated modules configured to implement a multi-mode, multi-stage business simulation game on a computer system according to some embodiments of the present invention.

FIG. 9 shows an exemplary sequence of steps and associated modules configured to implement a multi-mode, multi-stage business simulation game on a computer system according to some embodiments of the present invention. In a step 310, a start menu for the game is rendered. The start menu may include regions configured to receive user input making game selections such as a selection of a game mode (e.g. normal vs. scenario), number of players, length of game, other game options, and/or initiation of a new game or resumption of a saved game. A step 312, in which the system the system is configured for a game in normal mode, is performed upon user selection of a normal mode in step 310. A step 314, in which the system is configured in a scenario mode, is performed upon user selection of a scenario mode in step 310. Step 314 may include presenting a user interface and receiving corresponding user input selecting one scenario from among a plurality of selectable scenarios presented to a user. In a step 316, a scenario library storing scenario data is accessed, and display data characterizing the selected scenario is accessed for rendering. A scenario-specific user interface and additional rules-based display elements of the selected scenario are rendered graphically in a step 318. A step 320 is performed upon a user selection of a Jumpstart mode, as described above. Step 320 may include initiating and displaying the initial placement of a number of playing pieces on the playing surface, and associated game currency expenditures.

In a step 322, a set of stage-specific rules and associated functions are accessed in order to operate an expansion stage of the game, as described above. In steps 324 and 326, stage-specific rules and associated functions are accessed in order to operate restructuring and conclusion stages of the game, respectively. If different players are in different stages of the game, different stage-specific data and functions may be accessed by different players during each turn. In a step 330, a results table and/or library is tabulated upon determining that a condition for ending the game has occurred. The sequence of steps described above may be better understood by considering the detailed game-playing instructions below. The game-playing instructions illustrated both physical and electronic game play according to some embodiments.

It will be clear to one skilled in the art that the above embodiments may be altered in many ways without departing from the scope of the invention. Accordingly, the scope of the invention should be determined by the following claims and their legal equivalents.

What is claimed is:

1. A business-simulation board game kit for a multi-player game simulating a business and/or economy, comprising:
 a plurality of collections of playing pieces, the collections of playing pieces being visually distinct from each other, each collection of playing pieces assigned to a corresponding player of a plurality of players, each collection of playing pieces comprising a plurality of playing pieces representing a business or economy comprising a plurality of business segments, each collection of playing pieces comprising at least three types of playing pieces, each type of playing piece representing one business segment selected from the plurality of business segments, wherein a given business segment is represented by multiple playing pieces;
 a game board having a playing surface defining a plurality of game board areas arranged in an XY array having a first axis and a second axis orthogonal to the first axis, wherein the plurality of game board areas are arranged along the first axis by business complexity and along the second axis by value, wherein the game board comprises a plurality of business complexity visual markers disposed along the first axis and a plurality of value visual markers disposed along the second axis, each game board area being characterized by one business complexity denoted by a corresponding business complexity visual marker and one value denoted by a corresponding value visual marker, each game board area including a game currency profit graphical marker indicating a game currency profit characterizing said each game board area, the game currency profit being earned by a player by moving a playing piece into, out of, and/or within said each game board area, wherein the game board areas are configured to hold playing pieces placed on the board or moved along the board by players, and wherein the game board areas are configured to allow an alignment of a player's playing pieces, the alignment yielding a game currency bonus for the player, wherein the plurality of game board areas are arranged in a 3 by 3 array characterized by low, medium, and high business complexity along the first axis and by low, medium, and high value along the second axis, and wherein each game board area in the 3 by 3 array is subdivided into 3 by 3 subareas all sharing a common business complexity and value level, each subarea being sized to hold a single playing piece;

a business complexity die having faces denoting different business complexities;

a value die visually distinct from the business complexity die and having faces denoting different values; and a plurality of detachable scenario layers sized to be overlaid on the game board, each scenario layer representing a vertical industry or industry segment, a pre-defined starting formation for playing pieces, and/ or an extra-bonus zone on the board.

2. The business-simulation board game kit of claim 1, further comprising a set of game instructions for instructing players on playing the business simulation board game.

3. The business-simulation board game kit of claim 1, further comprising a plurality of pieces of game currency to be spent by the players by placing playing pieces on the game board, and earned by the players by moving playing pieces along the game board.

4. The business-simulation board game kit of claim 1, wherein the plurality of scenario layers represent at least one vertical industry selected from an auto industry, a pharmaceutical industry, and an information technology industry.

5. The business-simulation board game kit of claim 1, wherein the plurality of scenario layers represent a pre-defined starting formation for playing pieces, the starting formation representing locations for players' placement of playing pieces on the board before a start of a game.

6. The business-simulation board game kit of claim 1, wherein the plurality of scenario layers represent an extra-bonus zone on the board, the extra-bonus zone representing a zone on the board where players are awarded an additional bonus for generating a playing piece alignment within the zone.

7. The business-simulation board game kit of claim 1, wherein the game currency graphical marker denotes the game currency bonus generated by the alignment.

8. The business-simulation board game kit of claim 1, wherein the game currency profit characterizing the game board areas increases along the game board with business complexity and with value.

9. The business-simulation board game kit of claim 1, wherein the board game comprises an expansion stage, a restructuring stage, and a conclusion stage, wherein the expansion comprises placing playing pieces on the game board to represent an introduction of a product into a market, wherein the restructuring stage comprises exchanging playing pieces present on the game board with playing pieces outside the game board to represent a business restructuring, and wherein the conclusion stage comprises removing pieces from the game board to represent a business conclusion.

10. The business-simulation board game kit of claim 1, wherein a size of each of the plurality of scenario layers matches a size of the 3 by 3 array.

* * * * *